United States Patent
Wang et al.

(10) Patent No.: US 9,172,963 B2
(45) Date of Patent: Oct. 27, 2015

(54) JOINT CODING OF SYNTAX ELEMENTS FOR VIDEO CODING

(75) Inventors: Xianglin Wang, San Diego, CA (US); Marta Karczewicz, San Diego, CA (US); Wei-Jung Chien, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 13/283,335

(22) Filed: Oct. 27, 2011

(65) Prior Publication Data

US 2012/0106649 A1 May 3, 2012

Related U.S. Application Data

(60) Provisional application No. 61/409,052, filed on Nov. 1, 2010, provisional application No. 61/409,471, filed on Nov. 2, 2010, provisional application No. 61/432,548, filed on Jan. 13, 2011, provisional (Continued)

(51) Int. Cl.
  *H04N 19/13* (2014.01)
  *H04N 19/159* (2014.01)
  *H04N 19/176* (2014.01)

(52) U.S. Cl.
  CPC ............. *H04N 19/13* (2014.11); *H04N 19/159* (2014.11); *H04N 19/176* (2014.11)

(58) Field of Classification Search
  CPC ........................... H04N 7/26; H04N 19/00951
  USPC ............................ 375/240.13, 240.18, 240.23
  See application file for complete search history.

(56) References Cited

U.S. PATENT DOCUMENTS

| 4,816,914 A | 3/1989 | Ericsson |
| 5,768,434 A | 6/1998 | Ran |

(Continued)

FOREIGN PATENT DOCUMENTS

| CN | 1545813 A | 11/2004 |
| EP | 1478190 A1 | 11/2004 |

(Continued)

OTHER PUBLICATIONS

International Preliminary Report on Patentability—PCT/US2011/058608, The International Bureau of WIPO—Geneva, Switzerland, Jan. 24, 2013.

(Continued)

*Primary Examiner* — Christopher S Kelley
*Assistant Examiner* — Deirdre Beasley
(74) *Attorney, Agent, or Firm* — Shumaker & Sieffert, P.A.

(57) ABSTRACT

In one example, a video decoder is configured to determine whether a component of a transform unit of a coding unit of video data includes at least one non-zero coefficient based on a codeword for the transform unit, determine whether the transform unit is split into sub-transform units based on the codeword, and decode the transform unit based on the determinations. In another example, a video encoder is configured to determine whether a component of a transform unit of a coding unit of video data includes at least one non-zero coefficient, determine whether the transform unit is split into sub-transform units, select a codeword from a variable length code table, wherein the variable length code table provides an indication that the codeword corresponds to the determinations, and provide the codeword for the transform unit.

31 Claims, 10 Drawing Sheets

Related U.S. Application Data application No. 61/435,344, filed on Jan. 23, 2011, provisional application No. 61/449,556, filed on Mar. 4, 2011, provisional application No. 61/450,554, filed on Mar. 8, 2011, provisional application No. 61/451,448, filed on Mar. 10, 2011.

(56) References Cited

U.S. PATENT DOCUMENTS

| | | | |
|---|---|---|---|
| 7,289,673 B2 | 10/2007 | Lin et al. | |
| 7,379,608 B2 | 5/2008 | Marpe et al. | |
| 7,573,407 B2* | 8/2009 | Reznik | 341/67 |
| 7,843,998 B2 | 11/2010 | Bjontegaard | |
| 7,920,629 B2* | 4/2011 | Bjontegaard et al. | 375/240.18 |
| 8,619,856 B2* | 12/2013 | Chen et al. | 375/240.12 |
| 8,634,456 B2* | 1/2014 | Chen et al. | 375/240 |
| 2003/0202594 A1* | 10/2003 | Lainema | 375/240.16 |
| 2004/0023144 A1 | 2/2004 | Pickering et al. | |
| 2004/0066974 A1* | 4/2004 | Karczewicz et al. | 382/239 |
| 2006/0013302 A1* | 1/2006 | Bao et al. | 375/240.08 |
| 2006/0078049 A1 | 4/2006 | Bao et al. | |
| 2006/0233254 A1 | 10/2006 | Lee et al. | |
| 2007/0071339 A1 | 3/2007 | Yang et al. | |
| 2007/0223582 A1* | 9/2007 | Borer | 375/240.12 |
| 2008/0111721 A1* | 5/2008 | Reznik | 341/67 |
| 2008/0111722 A1* | 5/2008 | Reznik | 341/67 |
| 2008/0151995 A1* | 6/2008 | Youn | 375/240.2 |
| 2008/0260028 A1* | 10/2008 | Lamy-Bergot et al. | 375/240.13 |
| 2009/0087113 A1* | 4/2009 | Li et al. | 382/246 |
| 2009/0097568 A1 | 4/2009 | Karczewicz et al. | |
| 2009/0148057 A1* | 6/2009 | Chen et al. | 382/243 |
| 2009/0175334 A1* | 7/2009 | Ye et al. | 375/240.12 |
| 2010/0074544 A1* | 3/2010 | Chen | 382/246 |
| 2010/0086029 A1 | 4/2010 | Chen et al. | |
| 2011/0038422 A1* | 2/2011 | Cheon et al. | 375/240.18 |
| 2011/0080946 A1* | 4/2011 | Li et al. | 375/240.03 |
| 2012/0020408 A1* | 1/2012 | Chen et al. | 375/240.03 |
| 2012/0093217 A1* | 4/2012 | Jeon et al. | 375/240.02 |
| 2012/0106630 A1 | 5/2012 | Sugimoto et al. | |
| 2012/0106649 A1* | 5/2012 | Wang et al. | 375/240.18 |
| 2013/0034154 A1* | 2/2013 | Song et al. | 375/240.03 |

FOREIGN PATENT DOCUMENTS

| | | |
|---|---|---|
| JP | 3944225 B2 | 7/2007 |
| KR | 20040068535 A | 7/2004 |
| WO | 9905649 A1 | 2/1999 |
| WO | 2004039083 A1 | 5/2004 |
| WO | 2010039728 A3 | 4/2010 |

OTHER PUBLICATIONS

Second Written Opinion from International application No. PCT/US2011/058608, dated Oct. 31, 2012, 5 pp.

Chen P et al: "CE5: LCEC coded block flag coding under residual quadtree", 96. MPEG Meeting; Mar. 21, 2011-Mar. 25, 2011; Geneva; (Motion Picture Expert Group or ISO/IECJTC1/SC29/WG11), No. m19940, Mar. 20, 2011, XP030048507, the whole document.

International Search Report and Written Opinion—PCT/US2011/058608—ISA/EPO—Jan. 27, 2012.

Karczewicz, et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] Apr. 15-23, 2010, pp. 1-24.

Karczewicz M et al: "Variable length coding for coded block flag and large transform", 2. JCT-VC Meeting; Jul. 21, 2010-Jul. 28, 2010; Geneva; (Joint Collaborativeteam on Video Coding of ISO/IEC JTC1/SC29/WG11 and ITU-T SG.16 ); URL:HTTP://WFTP3.ITU.INT/AV-ARCH/JCTVC-SITE/, No. JCTVC-B098, Jul. 23, 2010, XP830007678, ISSN: 0000-0046 abstract point 1 point 2.1.2 point 2.2 table 1.

Wang X et al: "LCEC coded block flag coding under residual quadtree", 4. JCT-VC Meeting; 95. MPEG Meeting; Jan. 20, 2011-Jan. 28, 2011; DAEGU; (Joint Collaborative Team on Video Coding of ISO/IEC JTC1/SC29/WG11AND ITU-TSG.16); URL: HTTP://WFTP3.ITU.INT/AV-ARCH/JCTVC-SITE/, No. JCTVC-D375, Jan. 16, 2011, XP030008414, ISSN: 0000-0013 the whole document.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Reply to Written Opinion dated Jan. 27, 2012, from international application No. PCT/US2011/058608, filed Aug. 30, 2012, 6 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD2: Working Draft 2 of High-Efficiency Video Coding", Joint Collaborative Team on Video Coding, JCTVC-D503, Jan. 20-28, 2011, 153 pp.

ITU-T H.264, "Series H: Audiovisual and Multimedia Systems, Infrastructure of audiovisual services—Coding of moving video, Advanced video coding for generic audiovisual services," Mar. 2010, 669 pp.

Wiegand et al., "WD3: Working Draft 3 of High-Efficiency Video Coding," Document JCTVC-E603, 5th Meeting: Geneva, CH, Mar. 16-23, 2011, 193 pp.

Lee, "Improved side information signaling for quad-tree based transform structure of TMuC," 3rd Meeting, Oct. 7-15, 2010, Document: JCTVC-C068, 6 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

* cited by examiner

JOINT CODING OF SYNTAX ELEMENTS FOR VIDEO CODING

CLAIM OF PRIORITY UNDER 35 U.S.C. §119

This application claims the benefit of U.S. Provisional Application No. 61/409,052, filed Nov. 1, 2010; U.S. Provisional Application No. 61/409,471, filed Nov. 2, 2010; U.S. Provisional Application No. 61/432,548, filed Jan. 13, 2011; U.S. Provisional Application No. 61/435,344, filed Jan. 23, 2011; U.S. Provisional Application No. 61/449,556, filed Mar. 4, 2011; U.S. Provisional Application No. 61/450,554, filed Mar. 8, 2011; and U.S. Provisional Application No. 61/451,448, filed Mar. 10, 2011, the entire contents of each of which are incorporated herein by reference.

TECHNICAL FIELD

This disclosure relates to video coding, and more particularly, to syntax information for coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the upcoming standard for High Efficiency Video Coding (HEVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks. Each video block can be further partitioned. Video blocks in an intra-coded (I) frame or slice are encoded using spatial prediction with respect to neighboring video blocks. Video blocks in an inter-coded (P or B) frame or slice may be encoded using spatial prediction with respect to neighboring video blocks in the same frame or slice, or using temporal prediction with respect to other reference frames.

SUMMARY

In general, this disclosure describes techniques for coding coded block flag (CBF) and transform split flag (TSF) syntax elements for transform units (TUs) of coding units (CUs) of video data. A TU includes residual data for one or more components (e.g., chrominance and luminance components) of a CU. A CBF for a TU indicates whether residual data of the TU for a respective component of a CU includes at least one non-zero coefficient. A TSF for a TU indicates whether the TU is partitioned, or "split" into sub-TUs. The techniques of this disclosure include jointly coding CBFs and TSFs for TUs, which may improve compression efficiency.

In one example, a method of decoding video data includes determining whether a component of a transform unit of a coding unit of video data includes at least one non-zero coefficient based on a codeword for the transform unit, determining whether the transform unit is split into sub-transform units based on the codeword, and decoding the transform unit based on the determinations.

In another example, an apparatus for decoding video data includes a video decoder configured to determine whether a component of a transform unit of a coding unit of video data includes at least one non-zero coefficient based on a codeword for the transform unit, determine whether the transform unit is split into sub-transform units based on the codeword, and decode the transform unit based on the determinations.

In another example, an apparatus for decoding video data includes means for determining whether a component of a transform unit of a coding unit of video data includes at least one non-zero coefficient based on a codeword for the transform unit, means for determining whether the transform unit is split into sub-transform units based on the codeword, and means for decoding the transform unit based on the determinations.

In another example, a computer program product includes a computer-readable medium having stored thereon instructions that, when executed, cause a programmable processor to determine whether a component of a transform unit of a coding unit of video data includes at least one non-zero coefficient based on a codeword for the transform unit, determine whether the transform unit is split into sub-transform units based on the codeword, and decode the transform unit based on the determinations.

In another example, a method of encoding video data includes determining whether a component of a transform unit of a coding unit of video data includes at least one non-zero coefficient, determining whether the transform unit is split into sub-transform units, selecting a codeword from a variable length code table, wherein the variable length code table provides an indication that the codeword corresponds to the determinations, and providing the codeword for the transform unit. In this example, the method may further include sending the codeword into a bitstream.

In another example, an apparatus for encoding video data includes a video encoder configured to determine whether a component of a transform unit of a coding unit of video data includes at least one non-zero coefficient, determine whether the transform unit is split into sub-transform units, select a codeword from a variable length code table, wherein the variable length code table provides an indication that the codeword corresponds to the determinations, and provide the codeword for the transform unit. In this example, the video encoder may be further configured to send the codeword into a bitstream.

In another example, an apparatus for encoding video data includes means for determining whether a component of a transform unit of a coding unit of video data includes at least one non-zero coefficient, means for determining whether the transform unit is split into sub-transform units, means for selecting a codeword from a variable length code table, wherein the variable length code table provides an indication that the codeword corresponds to the determinations, and means for providing the codeword for the transform unit. In this example, the apparatus may further include means for sending the codeword into a bitstream.

In another example, a computer program product includes a computer-readable medium having stored thereon instructions that, when executed, cause a processor to determine whether a component of a transform unit of a coding unit of video data includes at least one non-zero coefficient, determine whether the transform unit is split into sub-transform units, select a codeword from a variable length code table, wherein the variable length code table provides an indication that the codeword corresponds to the determinations, and provide the codeword for the transform unit. In this example, the computer program product may further comprise instructions that cause the processor to send the codeword into a bitstream.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
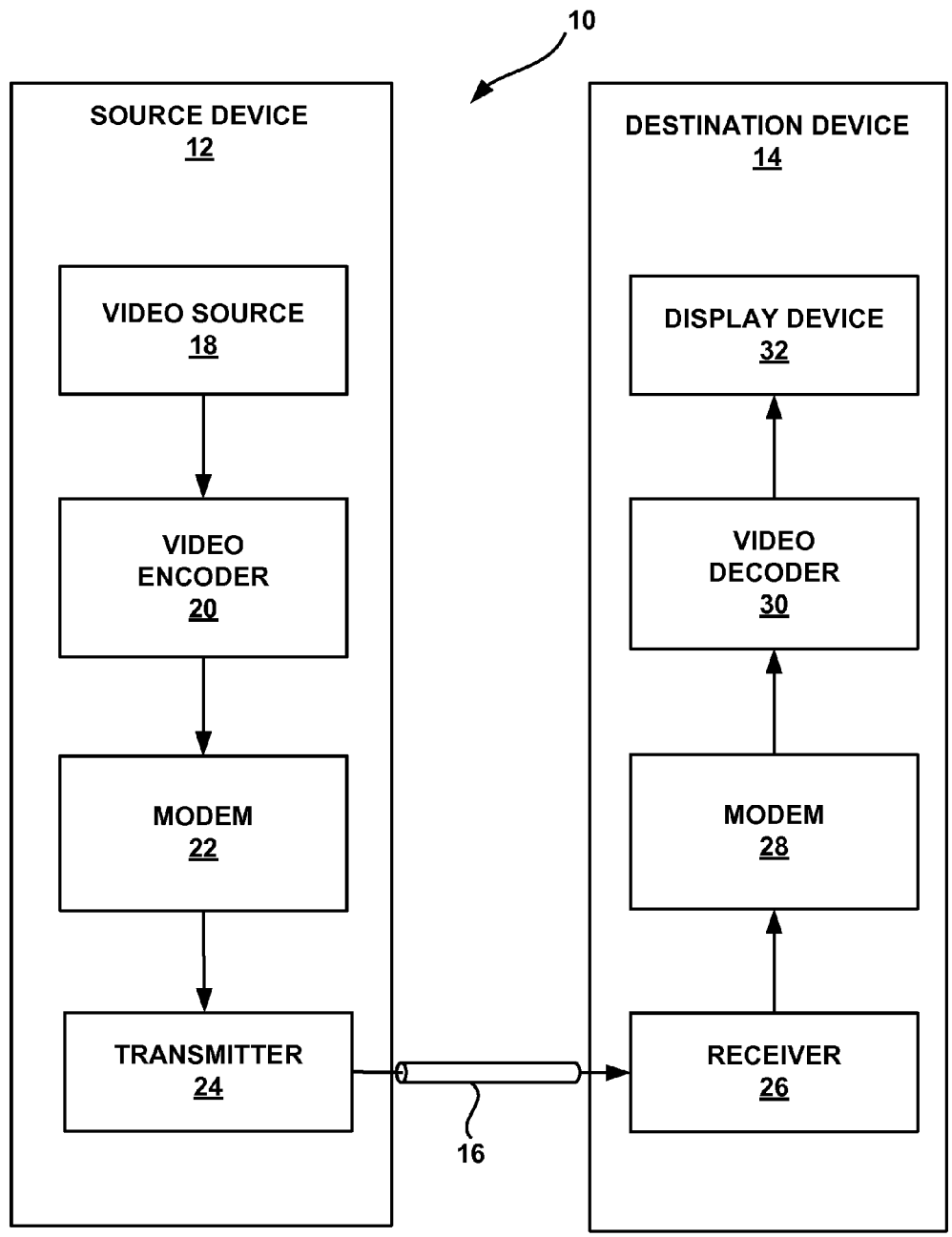
FIG. 1 is a block diagram that illustrates an example of a video encoding and decoding system that may implement techniques for jointly coding one or more coded block flags (CBFs) and a transform split flag (TSF) for a transform unit (TU) of a coding unit (CU) of video data.

In general, this disclosure describes techniques for coding coded block flag (CBF) and transform split flat (TSF) syntax elements for transform units (TUs) of coding units (CUs) of video data. In this disclosure, "coding" generally refers both to encoding video data at the encoder and decoding the video data at the decoder. A CU generally includes one or more prediction units (PUs) indicating how to form prediction data for the CU. TUs include residual data, that is, pixel-by-pixel differences between original video data and the prediction data, or a transformed version of the residual data i.e., transform coefficients. A frame of video data may be divided into a number of largest CUs (LCUs), which may further be partitioned into sub-CUs. A CU quadtree may describe how an LCU is partitioned into sub-CUs, and how each sub-CU is partitioned into further sub-CUs.

A CU that is not partitioned corresponds to a leaf-node of the CU quadtree. Such a CU may be referred to as a leaf-node CU. Each leaf-node CU includes one or more PUs and one or more TUs. Similar to CUs, TUs of a leaf-node CU may be partitioned into sub-TUs according to a TU quadtree. Each node of the TU quadtree may include a TSF syntax element, where the TSF indicates whether the TU corresponding to the node is "split," that is, partitioned into sub-TUs.

In general, video data is coded in a YUV color space, rather than an RGB color space. Whereas the RGB color space describes values of red, green, and blue components of pixels, the YUV color space describes values of luminance (Y) and chrominance (U and V) components of pixels, where U typically represents blue hues of chrominance and V represents red hues of chrominance. The YUV color space is also described as YCbCr, where Cb refers to blue hues and Cr refers to red hues. A TU of a CU typically includes one or more components, where each of the components corresponds to one of the Y, U, or V components of the CU. For example, a TU may include a Y component to represent luminance data, a U component to represent blue hue data, and a V component to represent red hue data.

Each node of the TU quadtree may also include one or more CBF syntax elements, where each CBF indicates whether the corresponding component of the TU corresponding to the node is coded. In particular, a component of a TU is considered "coded" when it includes at least one non-zero coefficient. In other words, a component of a TU is considered coded when it includes at least one coefficient that has an absolute value greater than zero. A CBF for a component of a TU has a value representing whether the component is coded, that is, whether the component includes at least one non-zero coefficient, or, in other words, at least one coefficient with an absolute value greater than zero.

The techniques of this disclosure may improve compression efficiency when coding CBF and TSF syntax elements for TUs of CUs of video data used to code the CUs. Note that in this context, a CBF or a TSF for a TU of a CU of video data is "coded" when the CBF or the TSF is encoded or decoded, that is, when an encoder or decoder maps values between a jointly coded CBF and TSF and a VLC codeword. In general, empirical testing performed in development of these techniques has demonstrated a correlation between CBFs and TSFs for TUs of CUs of video data. For example, in general, when a TU is split into sub-TUs, it may be probable that a component of the TU is also coded. As another example, when a component of a TU is not coded, it may be probable that the TU is not split into sub-TUs. There may also be a correlation between whether components of a same TU are coded. For example, when one component of the TU is coded, it may be probable that other components of the TU are also coded.

Jointly coding correlated syntax elements (e.g., one or more CBFs and a TSF) for a TU of a CU of video data using variable length coding (VLC) techniques may improve compression efficiency. For example, because of the correlation, certain combinations of values of the syntax elements may be more likely than other combinations. As such, when jointly coding the correlated syntax elements using VLC techniques, the combinations that are more likely may be assigned shorter VLC codewords than the other, less likely combinations. In this manner, codewords that correspond to the more likely combinations may comprise fewer bits than codewords that correspond to the less likely combinations. For example, a codeword that corresponds to a most likely combination may comprise only a single bit. As such, application of the techniques of this disclosure may yield a bitstream that more efficiently represents the syntax elements in the most likely cases, than coding the syntax elements individually for the TU, e.g., using a single-bit flag for each syntax element.

Additionally, jointly coding one of the correlated syntax elements (e.g., a TSF) for sub-TUs of a TU of a CU of video data based on values of the other correlated syntax element (e.g., a CBF) for the sub-TUs, once again using VLC techniques, may also improve compression efficiency. For example, because of the correlation described above, for a given sub-TU, certain values of one of the correlated syntax elements may be more likely than other values, depending on a value of the other correlated syntax element. As one example, certain values of a TSF for the sub-TU may be more likely than other values, depending on a value of a given CBF for the sub-TU. As such, when jointly coding TSFs for the sub-TUs, some combinations of values of the TSFs may be more likely than other combinations, depending on values of CBFs for the sub-TUs, e.g., CBFs for luminance (Y) components of the sub-TUs. As a result, to jointly code the TSFs, different VLC tables may be selected based on the values of the CBFs, such that the combinations of the values of the TSFs that are more likely given the values of the CBFs may be assigned shorter VLC codewords than other, less likely combinations.

Similarly, certain values of a given CBF for the sub-TU may be more likely than other values, depending on a value of the TSF for the sub-TU. As such, when jointly coding CBFs for the sub-TUs, corresponding to a particular component, e.g., luminance (Y) component, of each of the sub-TUs, some combinations of values of the CBFs may be more likely than other combinations, depending on values of the TSFs for the sub-TUs. As a result, to jointly code the CBFs, different VLC tables may be selected based on the values of the TSFs, such that the combinations of the values of the CBFs that are more likely given the values of the TSFs may be assigned shorter VLC codewords than other, less likely combinations. Once again, application of the techniques of this disclosure may yield a bitstream that more efficiently represents the syntax elements for the sub-TUs in the most likely cases, than coding the syntax elements individually for the sub-TUs, e.g., using a single-bit flag for each syntax element.

Accordingly, the techniques of this disclosure include jointly coding one or more CBFs and a TSF for a TU of a CU of video data. In some examples, when a value of one or more of the CBFs, or of the TSF for the TU can be inferred, the CBFs or TSF need not be jointly coded with the remaining CBFs and/or TSF for the TU.

As one example, there may be a correlation between whether a first chrominance component of the TU is coded, and whether a second chrominance component of the TU is coded. For example, when the first chrominance component (e.g., U) of the TU is coded, it may be probable that the second chrominance component (e.g., V) of the TU is also coded. Accordingly, when jointly coding the one or more CBFs and the TSF for the TU, the techniques of this disclosure may include coding a CBF representative of both chrominance components of the TU. That is, the techniques of this disclosure include bitwise "OR"ing CBFs for the chrominance components of the TU. In this manner, the techniques of this disclosure include providing a chrominance CBF, e.g., $CBF_C$, for the TU, where $CBF_C$ represents $CBF_U|CBF_V$, where U and V refer to the chrominance components of the TU, and '|' refers to the bitwise "OR" operator. The $CBF_C$ may further be jointly coded with the TSF for the TU. When a value of the $CBF_C$ for the TU indicates that at least one of the chrominance components of the TU is coded, additional information may be provided indicative of whether each individual chrominance component of the TU is coded. In some examples, when a value of one of the CBFs for the chrominance components of the TU can be inferred, the additional information need not be provided.

In other examples, there may also be a correlation between whether each sub-TU of a TU of a CU of video data is split into further sub-TUs, and whether one or more components of each sub-TU are coded, as previously described. As one example, when each sub-TU is split into the further sub-TUs, it may be probable that one or more components (e.g., Y component) of each sub-TU are coded. Additionally, when one or more components of each sub-TU are not coded, it may be probable that each sub-TU is not split into the further sub-TUs. Accordingly, the techniques of this disclosure include jointly coding TSFs for sub-TUs of a TU of a CU of video data. For example, the techniques of this disclosure may include jointly coding the TSFs for the sub-TUs when none of the CBFs for each sub-TU is coded, i.e., values of the CBFs for the sub-TUs are inferred. Once again, when a value of one or more of the TSFs for the sub-TUs can be inferred, the TSFs need not be jointly coded with the remaining TSFs for the sub-TUs.

Additionally, the techniques of this disclosure include jointly coding CBFs for a component of each of the sub-TUs. For example, the techniques may include jointly coding CBFs for a Y component of each of the sub-TUs when none of the CBFs for the chrominance components of each sub-TU is coded, i.e., values of the CBFs for the chrominance components of the sub-TUs are inferred, and when a TSF for each of the sub-TUs is also not coded, i.e., values of the TSFs for the sub-TUs are also inferred. Once again, when a value of one or more of the CBFs for the component of each of the sub-TUs can be inferred, the CBFs need not be jointly coded with the remaining CBFs for the sub-TUs.

FIG. 1 is a block diagram that illustrates an example of a video encoding and decoding system 10 that may implement techniques for jointly coding one or more CBFs and a TSF for a TU of a CU of video data. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern jointly coding one or more CBFs and a TSF for a TU of a CU of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 and/or video decoder 30 of destination device 14 may be configured to apply the techniques for jointly coding one or more CBFs and a TSF for a TU of a CU of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for jointly coding one or more CBFs and a TSF for a TU of a CU of video data may be performed by any digital video encoding and/or decoding device. Although generally the techniques of this disclosure are performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process described above may implement one or more of the techniques described herein to jointly code one or more CBFs and a TSF for a TU of a CU of video data. The information communicated over channel 16 may include syntax information defined by video encoder 20, which may also be used by video decoder 30, and may include, e.g., syntax elements that describe whether a component of a TU of a CU of video data includes at least one non-zero coefficient, that is, whether the component is coded, and whether the TU is split into sub-TUs. Video decoder 30 uses this syntax information, as well as other data in the bitstream, to decode the encoded bitstream, and to pass the decoded information to display device 32. Display device 32, in turn, displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2, ITU-T H.263, and the upcoming High Efficiency Video Coding (HEVC) standard. In general, the techniques of this disclosure are described with respect to HEVC, but it should be understood that these techniques may be used in conjunction with other video coding standards as well. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder and decoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. Each video frame may include a plurality of slices, i.e., portions of the video frame. Each slice may include a plurality of video blocks (e.g., LCUs), each of which may be partitioned into smaller blocks, also referred to as sub-blocks (e.g., sub-CUs). According to the ITU-T H.264 standard, a video block may correspond to a macroblock or a partition of a macroblock. According to HEVC, a video block may correspond to a CU, or a partition of a CU. In general, LCUs and sub-CUs thereof (that is, any CU of a CU quadtree) may be referred to as a "CU."

Depending on the specified coding standard, video blocks may be partitioned into various "N×N" sub-block sizes, such as 16×16, 8×8, 4×4, 2×2, and so forth. Video encoder 20 may partition each block recursively, that is, partition a 2N×2N block into four N×N blocks, and partition any or all of the N×N blocks into four (N/2)×(N/2) blocks, and so forth. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have sixteen pixels in a vertical direction (y=16) and sixteen pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. As one example, in the ITU-T H.264 standard, blocks that are 16 by 16 pixels in size may be referred to as macroblocks, and blocks that are less than 16 by 16 pixels may be referred to as partitions of a 16 by 16 macroblock. In other standards, blocks may be defined more generally with respect to their size, for example, as CUs and partitions thereof, each having a varying size, rather than a fixed size.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized.

In general, video encoder 20 partitions a block into sub-blocks according to a block partitioning process. For example, video encoder 20 may be configured to partition a block into sub-blocks when the block includes high-frequency changes or other high amounts of detail. In some examples, video encoder 20 implements a rate-distortion optimization process that determines whether to partition a block into sub-blocks. Using smaller blocks to code video data may result in better prediction for blocks that include high levels of detail, and may therefore reduce the resulting error (that is, pixel-by-pixel difference between the prediction data and the original video data), represented as residual data. Each block of video data includes a set of data providing coding information for the block. This set of data is considered overhead for the block, also referred to as metadata for the block of coded video data. Thus, although smaller blocks may yield lower residual values for the blocks, the benefits of using small blocks may be outweighed by the overhead of the header data for the small blocks, in some cases. Accordingly, video encoder 20 may be configured to perform a rate-distortion optimization process, in which video encoder 20 attempts to determine an optimal (or acceptable) partitioning scheme that balances the reduction in error (residual data or distortion) with the overhead (bit rate) associated with each of the blocks.

In general, video blocks refer to both parent blocks and partitions thereof (i.e., sub-blocks). A slice generally includes a plurality of video blocks (e.g., a set of LCUs), any or all of which may be partitioned into sub-blocks (e.g., sub-CUs) that may be further partitioned in a recursive fashion. Each slice may correspond to an independently decodable unit of video data. Alternatively, frames themselves may correspond to decodable units, or other portions of a frame may be defined as decodable units. The term "coded unit" may refer to any independently decodable unit of video data, such as an entire frame, a slice of a frame, a group of pictures (GOP) also referred to as a sequence, or other independently decodable unit defined according to applicable coding techniques.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes, e.g., based on the size of a block being intra-prediction coded.

HM refers to a block of video data as a CU. A CU may refer to a 2N×2N pixel image region that serves as a basic unit to which various coding tools are applied for compression. A CU is conceptually similar to a macroblock of H.264/AVC. Syntax data within a bitstream may define an LCU, which is a largest CU in terms of the number of pixels for a particular unit (e.g., a slice, frame, GOP, or other unit of video data including LCUs). In general, a CU has a similar purpose to a macroblock of H.264, except that a CU does not have a size distinction. Thus, in general, any CU may be partitioned, or split into sub-CUs. A number of times an LCU is partitioned to generate a particular CU may be referred to as a partition level, decomposition level, or a "depth" of the CU. In some cases, syntax data defines a maximum partition level for an LCU, which may, in turn, restrict the smallest sized CU (SCU) that can occur for the LCU.

In general, references in this disclosure to a CU may refer to an LCU of video data, or a sub-CU of an LCU. An LCU may be split into sub-CUs, and each sub-CU may be further split into sub-CUs, and so forth. As described above, syntax data for a bitstream may define a maximum number of times an LCU may be split, which may be referred to as a maximum partition level. As also described above, a bitstream may also define an SCU. This disclosure also uses the term "block" to refer to any of a CU, a prediction unit (PU) of a CU, or a transform unit (TU) of a CU. PUs and TUs are described in greater detail below.

An LCU may be associated with a quadtree data structure that indicates how the LCU is partitioned. A quadtree data structure associated with an LCU may be referred to as a CU quadtree. In general, a CU quadtree includes one node per CU of an LCU, where a root node corresponds to the LCU, and other nodes correspond to sub-CUs of the LCU. If a given CU is split into four sub-CUs, the node in the quadtree corresponding to the split CU includes four child nodes, each of which corresponds to one of the sub-CUs. Each node of the quadtree data structure may provide syntax information for the corresponding CU. For example, a node in the quadtree may include a split flag for a corresponding CU, indicating whether the CU is split into four sub-CUs. Syntax information for a given CU may be defined recursively, and may depend on whether the CU is split into sub-CUs.

A CU that is not split (i.e., a CU corresponding to a terminal, or "leaf" node in a respective CU quadtree) may include one or more prediction units (PUs). In general, a PU represents all or a portion of the corresponding CU, and includes data for retrieving a reference sample for the PU for purposes of performing prediction for the CU. For example, when the CU is intra-mode encoded, the PU may include data describing an intra-prediction mode for the PU. As another example, when the CU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

A leaf node CU may also include one or more transform units (TUs). Following prediction for a CU using one or more PUs, as described above, video encoder 20 may calculate one or more residual blocks for the respective portions of the CU corresponding to the one of more PUs. The residual blocks may represent a pixel difference between the video data for the CU and the predicted data for the one or more PUs. In general, a TU represents all or a portion of the residual blocks for the CU, and includes data for transforming and quantizing the corresponding residual block data, where the residual block is represented using residual data. For example, video encoder 20 may transform the residual data into transform coefficients, then quantize, and scan the transform coefficients of the TUs to form a set of quantized transform coefficients. A TU is not necessarily limited to the size of a PU. Thus, TUs may be larger or smaller than corresponding PUs for the same CU. In some examples, the maximum size of a TU may correspond to the size of the corresponding CU.

A CU of video data may include each of a luminance component (Y), a first chrominance component (U), and a second chrominance component (V) of the corresponding video data. Accordingly, prediction and transform for a CU, as described above with reference to PUs and TUs, may be performed for each of the Y, U, and V components of a given CU of video data. In some examples, prediction information (e.g., a prediction mode (intra- or inter-prediction) and characteristics thereof (e.g., a specific intra-prediction mode or a motion vector)) may be determined with respect to the luminance (Y) component, and reused for the chrominance (U and V) components. As such, for a given TU of a CU, coefficients of residual data of the TU may be referred to as coefficients of residual data for Y, U, and V components of the TU. That is, the determined prediction information may be applied to each of the components of the TU to form individual blocks of residual data for each of the components, where the blocks of residual data include coefficients representative of pixel-by-pixel differences. Subsequently, the residual data may be transformed and quantized, forming blocks of quantized transform coefficients for each of the Y, U, and V components of the TU.

A leaf-node CU may further include a transform quadtree data structure that defines partitioning of one or more TUs of the CU. A transform quadtree data structure may indicate partition information for TUs of a CU in a substantially similar manner as the CU quadtree described above with reference to an LCU. For example, the transform quadtree data structure may define how a largest TU of the CU is partitioned into sub-TUs. In some examples, the transform quadtree data structure may be referred to as a "residual quadtree transform" (RQT). Each node of an RQT may include syntax information describing whether a component (e.g., Y, U, or V) of a TU corresponding to the node includes at least one non-zero coefficient, i.e., is coded, and whether the TU is split into sub-TUs. This syntax information generally corresponds to the CBF and TSF syntax elements for the TU, as described above. Generally, a TU that is split into sub-TUs according to an RQT may be referred to as a parent TU of the sub-TUs, and the sub-TUs may be referred to as child TUs of the TU. Additionally, the sub-TUs may be referred as sibling TUs of one another. TUs that are not split into sub-TUs according to an RQT may be referred to as leaf-node TUs of the RQT.

In other examples, according to the techniques of this disclosure, a TU of a CU may be partitioned according to a uniform partition structure, which is described in greater detail below with reference to FIG. 5C. In these examples, the TU may be a largest TU of the CU, or a sub-TU of the largest TU of the CU. A largest TU of a CU may be partitioned into sub-TUs according to both an RQT and a uniform partition structure. As one example, the largest TU may be partitioned into sub-TUs according to an RQT, and one or more of the sub-TUs may be partitioned into further sub-TUs according to a uniform partition structure. As another example, the largest TU may be partitioned entirely according to a uniform partition structure. Once again, a TU that is split into sub-TUs according to a uniform partition structure may be referred to as a parent TU of the sub-TUs, and the sub-TUs may be referred to as child TUs of the TU, and as sibling TUs of one another. Furthermore, the sub-TUs may not be split into further sub-TUs, and thus may represent leaf-node TUs of the TU partition structure for the CU, whether defined using an RQT and a uniform partition structure, or solely a uniform partition structure, as previously described.

In a similar manner as described above with reference to an RQT, each sub-TU of a TU partitioned according to the uniform partition structure may include syntax information describing whether a component (e.g., Y, U, or V) of the sub-TU includes at least one non-zero coefficient. As described above, this syntax information generally corresponds to a CBF for the sub-TU, which may be referred to simply as a TU. Additionally, for the sub-TUs of the TU there may exist syntax information that collectively describes how the TU is split into the sub-TUs. In other words, the syntax information may indicate how many sub-TUs result from splitting the TU according to the uniform partition structure, and the size of each sub-TU. For example, this syntax information for the sub-TUs may be included in the TU.

In some examples, CBF and TSF syntax elements for a TU of a CU of video data may each be represented using a single-bit value, e.g., a single-bit flag, as previously described. Referring to the example of the RQT partitioning structure described above, in some cases, all three CBFs corresponding to Y, U, and V components of the TU may be included in a corresponding node of an RQT associated with the TU. In other cases, only a subset of the CBFs may be included in the node, e.g., when values of one or more of the CBFs can be inferred.

In general, according to the techniques of this disclosure, a value of a CBF for a component of a TU can be inferred when a value of a CBF for the same component of a parent TU of the TU indicates that the component of the parent TU is not coded (that is, does not include any non-zero coefficients). In this case, a value of a CBF for the same component of each child TU of the parent TU can be inferred to indicate that the respective component is not coded. Additionally, a value of a CBF for a component of a TU can also be inferred when a value of a CBF for the same component of a parent TU of the TU indicates that the component of the parent TU is coded (that is, includes at least one non-zero coefficient), and a value of a CBF for the same component of every other child TU of the parent TU indicates that the respective component is not coded. In this case, the value of the CBF for the component of the TU can be inferred to indicate that the component is coded.

In still other cases, only the CBFs for the TU may be included in the corresponding node of the RQT, e.g., when a value of the TSF for the TU can be inferred. In general, according to the techniques of this disclosure, a value of a TSF for a TU can be inferred when the TU has a size that is larger than a maximum permitted size for the CU, e.g., a maximum permitted size of transform for the CU. In this case, the value of the TSF for the TU may be inferred to indicate that the TU is split into sub-TUs. Similarly, a value of a TSF for a TU can also be inferred when the TU corresponds to a smallest-sized TU for the CU, e.g., a minimum permitted size of transform for the CU. In this case, the value of the TSF for the TU may be inferred to indicate that the TU is not split into sub-TUs. It should be noted that inferring a value for a CBF or a TSF syntax element for a TU of a CU of video data may be referred to as inferring the syntax element itself throughout this disclosure.

Furthermore, in some cases, the Y, U, and V components of a TU of a CU may be partitioned individually, e.g., according to an RQT and/or a uniform partition structure corresponding to each component. In such cases, a TSF may be provided in a node of an RQT corresponding to each of the Y, U, and V components of the TU. Furthermore, syntax information that indicates how many sub-TUs result from splitting the TU according to the uniform partition structure may be provided for the TU for each of the Y, U, and V components.

In other examples, Y, U, and V components of a TU of a CU may be partitioned together, i.e., according to a common RQT and/or a uniform partition structure. In these examples, a single TSF may be included for a given TU of the CU in a corresponding node of the RQT. Similarly, syntax information that indicates how many sub-TUs result from splitting the TU according to the uniform partition structure may be included for the TU for all of the Y, U, and V components.

Following intra-predictive or inter-predictive encoding to produce predictive data and residual data, and following any transforms (such as the 4×4 or 8×8 integer transforms, similar to those used in H.264/AVC, or a discrete cosine transform DCT) to produce transform coefficients, video encoder 20 may quantize the transform coefficients. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to context adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information, such as coded block pattern (CBP) values, macroblock type, coding mode, maximum macroblock size for a coded unit (such as a frame, slice, macroblock, or sequence), or the like. According to some coding standards, such syntax information may include CBF and TSF syntax elements for a TU of a CU of video data, e.g., represented using an RQT, as previously described.

Recently, with the focus of video coding shifted toward high definition video and improved compression, more numerous and increasingly sophisticated prediction modes have been introduced to achieve better coding efficiency, resulting in more elaborate PU and TU partitioning schemes for coded CUs of video data. This disclosure provides techniques for improving the efficiency with which TU partition information, e.g., indicated using an RQT, as previously described, is signaled.

For example, rather than providing individual CBFs and TSFs for each TU of a CU, in some examples, video encoder 20 may jointly encode one or more CBFs and a TSF for a given TU of the CU. Likewise, in other examples, video decoder 30 may be configured to receive a single value from which video decoder 30 may determine the one or more CBFs and the TSF for the TU. For example, the one or more CBFs and the TSF may be included in a node of an RQT that corresponds to the TU.

Similarly, in some examples, video encoder 20 may jointly encode CBFs or TSFs for sub-TUs of a given TU of the CU. Likewise, in still other examples, video decoder 30 may be configured to receive a single value from which video decoder 30 may determine the CBFs or the TSFs for the sub-TUs. In some cases, the CBFs or TSFs may be included in multiple nodes of an RQT that correspond to the sub-TUs.

In any case, when a value of one or more of the CBFs and the TSF for the TU can be inferred, the CBFs and the TSF need not be jointly coded with the remaining CBFs and/or TSF for the TU. Similarly, when a value of one or more of the CBFs or the TSFs for the sub-TUs can be inferred, the CBFs or the TSFs need not be jointly coded with the remaining CBFs or TSFs for the sub-TUs. In this manner, only CBFs and TSFs that cannot be inferred are jointly coded with other CBFs and/or TSFs.

In some examples, video encoder 20 may jointly encode the one or more CBFs and the TSF for the TU using a single VLC codeword. In these examples, the single value which video decoder 30 may be configured to receive may comprise the VLC codeword, which video decoder 30 may decode to determine the one or more CBFs and the TSF for the TU. Similarly, in other examples, video encoder 20 may jointly encode the CBFs or the TSFs for the sub-TUs also using a single VLC codeword. As one example, video encoder 20 may jointly encode the TSFs for the sub-TUs using the single VLC codeword when none of the CBFs for each sub-TU is coded, i.e., values of the CBFs for the sub-TUs are inferred. As another example, video encoder 20 may jointly encode CBFs for a Y component of each of the sub-TUs, using the single VLC codeword, when none of the CBFs for the chrominance components of each sub-TU is coded, i.e., values of the CBFs for the chrominance components of the sub-TUs are inferred, and when a TSF for each of the sub-TUs is also not coded, i.e., values of the TSFs for the sub-TUs are also inferred. Once again, in these examples, the single value which video decoder 30 may be configured to receive may comprise the VLC codeword, which video decoder 30 may decode to determine the CBFs or the TSFs for the sub-TUs.

As previously described, according to the techniques of this disclosure, only CBFs and TSFs that cannot be inferred are jointly coded with other CBFs and/or TSFs. Additionally, when the CBFs and the TSFs that cannot be inferred are jointly coded using VLC codewords, different VLC tables may be used depending on which CBFs and TSFs can be inferred. For example, according to the techniques of this disclosure, a "flag pattern" for a TU may be used to select different VLC tables to jointly code one or more CBFs and a TSF for the TU, depending on whether one or more of the CBFs and the TSF for the TU can be inferred. Also according to the techniques of this disclosure, a flag pattern for each of sub-TUs of a TU may be used to select different VLC tables to jointly code CBFs or TSFs for the sub-TUs, depending on whether one or more of the CBFs or the TSFs for the sub-TUs can be inferred.

For example, a flag pattern for a TU, including a sub-TU of a TU, may be initially determined to include a TSF inferable flag for the TU, and CBFs for Y, U, and V components of a parent TU of the TU. For example, the TSF inferable flag for the TU may indicate whether a TSF for the TU can be inferred using the techniques previously described. As such, the flag pattern may be represented using four single-bit values, e.g., four single-bit flags. To select a particular VLC table to code one or more CBFs and the TSF for the TU, the flag pattern may be used to indicate which of the one or more CBFs and the TSF can be inferred, and therefore not jointly coded with the remaining CBFs and/or TSF for the TU, using the techniques applicable to inferring CBFs and TSFs for TUs, as previously described. Similarly, to select a particular VLC table to code CBFs or TSFs for sub-TUs of the TU, a flag pattern for each of the sub-TUs may be used to indicate which of the CBFs or the TSFs for the sub-TUs can be inferred, and therefore not jointly coded with the remaining CBFs or TSFs for the sub-TUs, also using the techniques applicable to inferring CBFs and TSFs for TUs, as previously described.

For example, if a given CBF for the TU can be inferred based on a corresponding CBF for a parent TU of the TU, and, in some cases, corresponding CBFs for sibling TUs of the TU, as also described above, the corresponding bit value in the flag pattern may be set to indicate the inference (e.g., "0"). On the other hand, if the CBF cannot be inferred, the corresponding bit value may be set accordingly (e.g., "1"). The bit value corresponding to the TSF inferable flag in the flag pattern for the TU may be set in a similar manner, e.g., if the TSF for the TU can be inferred, the corresponding bit value of the TSF inferable flag may be set to "0," and if the TSF cannot be inferred, the corresponding bit value of the TSF inferable flag may be set to "1." As such, in the case of jointly coding the one or more CBFs and the TSF for the TU, a VLC table may be selected based on the flag pattern to reflect which of the one or more CBFs and the TSF for the TU can be inferred, and which of the one or more CBFs and the TSF are jointly coded. Similarly, in the case of jointly coding the CBFs or the TSFs for the sub-TUs of the TU, a VLC table may be selected based on flag patterns of each of the sub-TUs to reflect which of the CBFs or the TSFs for the sub-TUs can be inferred, and which of the CBFs or the TSFs are jointly coded.

The techniques of this disclosure take advantage of correlation, discovered during empirical testing, between information indicating whether a component of a TU of a CU of video data includes at least one non-zero coefficient, i.e., is coded, and information indicating whether the TU is split into sub-TUs. As one example, such correlation may exist between information indicating whether a luminance component of a TU of a CU of video data is coded, and information indicating whether the TU is split into sub-TUs. For example, when a TU is split into sub-TUs, it may be likely that a luminance component of the TU is coded. Similarly, when a luminance component of a TU is not coded, it may be likely that the TU is not split into sub-TUs.

As another example, in cases where each component of a TU is partitioned independently from other components (that is, each component includes unique partition information), and when the component is not coded, it may be likely that the component of the TU is not split into sub-TUs corresponding to the component. Similarly, when the component of the TU is split into sub-TUs corresponding to the component, it may be likely that the component of the TU is coded.

More generally, in cases where all components of a TU are partitioned in the same manner (that is, each component shares the same partition information), and when the components are not coded, it may be likely that the TU is not split into sub-TUs. Similarly, when the TU is split into sub-TUs, it may be likely that each of the components of the TU is coded.

Additionally, there may also be a correlation between information indicating whether components of a same TU of a CU of video data are coded, as previously described. For example, when one component of the TU is coded, it may be probable that other components of the TU also are coded. As one example, such correlation may exist between information indicating whether the chrominance components of a TU of a CU of video data are coded. For example, when a first chrominance component (e.g., U) of the TU is coded, it may be likely that a second chrominance component (e.g., V) of the TU is coded, and vice versa.

These techniques may take advantage of this discovered correlation to improve compression efficiency with respect to coded CBF and TSF syntax elements by jointly coding information represented by the syntax elements. For example, due to the above-described correlation, some combinations of CBF and TSF values for a TU of a CU may be more likely than other combinations. When jointly coding one or more CBFs and a TSF for the TU using a single VLC codeword, if codewords comprising fewer bits than individually coded one or more CBFs and TSF (e.g., each comprising a single-bit codeword) are assigned to the more likely combinations, compression efficiency may be improved. Similarly, some combinations of CBF or TSF values for sub-TUs of a TU of a CU may be more likely than other combinations. When jointly coding CBFs or TSFs for the sub-TUs using a single VLC codeword, if codewords comprising fewer bits than individually coded CBFs or TSFs (e.g., once again, each comprising a single-bit codeword) are assigned to the more likely combinations, compression efficiency may once again be improved.

In accordance with the techniques of this disclosure, one or more CBFs and a TSF for a TU of a CU of video data may be jointly coded. As one example, video encoder 20 of source device 12 may encode blocks of video data (e.g., one or more CUs). Video encoder 20 may be configured to determine whether a component of a TU of a CU of video data includes at least one non-zero coefficient, determine whether the TU is split into sub-TUs, select a codeword from a VLC table, wherein the VLC table provides an indication that the codeword corresponds to the determinations, and provide the codeword for the TU. In this example, video encoder 20 may be further configured to send the codeword into a bitstream.

Video encoder 20 may be further configured to determine an encoding context for the TU used to select the particular VLC table. The context may include various characteristics of the TU, e.g., one or more of the following: a prediction mode for a PU corresponding to the TU, a partition level for the TU, and a number of components of the TU to be represented by the codeword.

Video encoder 20 may use the encoding context to select the VLC table. In addition, when one of the CBFs for the chrominance components of the TU is coded and another is inferred, and is therefore not jointly coded with the other CBFs, video encoder 20 may select a same VLC table regardless of which CBF is coded and which CBF is inferred. In these examples, the VLC table may include a mapping of codewords to CBF and TSF values. Also, when the TSF for the TU is inferred, and is therefore not jointly coded with the one or more CBFs for the TU, video encoder 20 may select a different VLC table than when the TSF is coded along with the one or more CBFs. Furthermore, video encoder 20 may select a different VLC table depending on a value of the inferred TSF. In these examples, the VLC table may include a mapping of codewords to CBF values.

Video encoder 20 may further select the codeword that corresponds to the one or more CBFs and the TSF for the TU from the VLC table. Finally, video encoder 20 may provide the codeword for the TU. Once again, in this example, video encoder 20 may be further configured to send the codeword into a bitstream.

Additionally, for the VLC table, video encoder 20 may update the mapping of the codewords to the CBF and TSF values based on the above determinations to reflect which determinations are more or less likely to occur for the encoding context. For example, video encoder 20 may keep track of how often each combination of CBF and TSF values occurs for the encoding context, and set codewords associated with each combination such that the codewords have lengths that are inversely proportional to the likelihood of the corresponding combinations.

As one example, video encoder 20 may be configured to jointly encode a CBF for a luminance component of the TU, e.g., $CBF_Y$, a CBF for both chrominance components of the TU, e.g., $CBF_C$ as previously described, and a TSF for the TU. For example, in cases where the component comprises a first chrominance component of the TU, and wherein the TU further comprises a second, different chrominance component, video encoder 20 may be further configured to determine whether the second chrominance component includes at least one non-zero coefficient. In this example, to select the codeword from the VLC table, video encoder 20 may be configured to select the codeword such that the VLC table provides an indication that the codeword represents whether at least one of the first chrominance component and the second chrominance component includes at least one non-zero coefficient, i.e., represents the $CBF_C$ for the TU.

In the event the $CBF_C$ value for the TU indicates that at least one of the chrominance components includes at least one non-zero coefficient, video encoder 20 may be further configured to encode additional information indicative of whether each individual chrominance component includes at least one non-zero coefficient. In some examples, however, when the value of one of the two CBFs for the chrominance components can be inferred, video encoder 20 may be configured to not encode the additional information.

According to some examples, to encode the additional information, video encoder 20 may be configured to encode the CBFs for the chrominance components of the TU individually. According to other examples, video encoder 20 may be configured to jointly encode the CBFs for the chrominance components of the TU in a similar manner as described above with reference to jointly encoding one or more CBFs and a TSF for a TU of a CU of video data. For example, in cases where at least one of the first chrominance component and the second chrominance component includes at least one non-zero coefficient, video encoder 20 may be further configured to select a second, different codeword from a second, different VLC table, wherein the second VLC table provides an indication that the second codeword represents whether the first chrominance component includes at least one non-zero coefficient, and whether the second chrominance component includes at least one non-zero coefficient. Video encoder 20 may be further configured to provide the second codeword for the TU. In this example, video encoder 20 may be further configured to send the second codeword into a bitstream.

In this example, once again, video encoder 20 may be configured to determine a second, different encoding context for the TU used to select the second VLC table. The context may include one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which CBFs and TSFs were previously jointly encoded in the same manner as described herein. In some examples, video encoder 20 may use a same encoding context for selecting both the first VLC table and the second VLC table, in which case the first and second encoding contexts discussed above may comprise the same context.

Once again, video encoder 20 may use the second encoding context to select the second VLC table. For example, the second VLC table may include a mapping of the codewords to $CBF_U$ and $CBF_V$ values. Video encoder 20 may further select the second codeword that corresponds to the chrominance CBFs, i.e., the $CBF_U$ and $CBF_V$, for the TU from the second VLC table. Finally, video encoder 20 may provide the second codeword for the TU. Once again, in this example, video encoder 20 may be further configured to send the second codeword into a bitstream.

Additionally, once again, for the second VLC table, video encoder 20 may update the mapping of the codewords to the $CBF_U$ and $CBF_V$ values based on the above determinations to reflect which determinations are more or less likely to occur for the second encoding context. For example, video encoder 20 may keep track of how often each combination of $CBF_U$ and $CBF_V$ values occurs for the second encoding context, and set codewords associated with each combination such that the codewords have lengths that are inversely proportional to the likelihood of the corresponding combinations.

As still another example, CBFs or TSFs for sub-TUs of the TU may be jointly coded. For example, where the TU is split into the sub-TUs, video encoder 20 may be further configured to select a second, different codeword representative of whether the sub-TUs are split into further sub-TUs, and provide the second codeword for the sub-TUs. Similarly, video encoder 20 may select the second codeword such that it represents whether components of the sub-TUs corresponding to the component of the TU include at least one non-zero coefficient, and provide the second codeword for the sub-TUs. In these examples, video encoder 20 may be further configured to send the second codeword into a bitstream.

In these examples, the second codeword may also comprise a VLC codeword. The second codeword may be selected from a second, different VLC table using a second, different encoding context. For example, when jointly encoding the TSFs for the sub-TUs, the second encoding context may include values of the CBFs for the sub-TUs. Similarly, when jointly encoding the CBFs for the sub-TUs, the second encoding context may include values of the TSFs for the sub-TUs.

In any case, video encoder 20 may encode the CU to include the CBFs and the TSF for the TU, and/or the CBFs or the TSFs for the sub-TUs, using the respective VLC codewords. Because using the VLC techniques described above may, in the average case, result in the codewords comprising fewer bits than individually encoded CBFs and TSFs represented by the codewords, there may be a relative bit savings for a coded bitstream including the codewords when using the techniques of this disclosure.

Video decoder 30 of destination device 14 may ultimately receive encoded video data (e.g., one or more CUs) from video encoder 20, e.g., via modem 28 and receiver 26. Alternatively, video decoder 30 may receive encoded video data from a storage medium, such as a CD-ROM, Blu-Ray disc, flash drive, hard drive, or other storage medium. Once again, as one example, one or more CBFs and a TSF for a TU of a CU of video data may be jointly coded. In accordance with the techniques of this disclosure, video decoder 30 may be configured to determine whether a component of a TU of a CU of video data includes at least one non-zero coefficient based on a codeword for the TU, determine whether the TU is split into sub-TUs based on the codeword, and decode the TU based on the determinations.

In some examples, video decoder 30 may be configured to determine a decoding context for the TU in a manner substantially similar to that used by video encoder 20, as previously described, to select a particular VLC table containing the codeword. For example, the decoding context may include various characteristics of the TU, e.g., one or more of the following: a prediction mode for a PU corresponding to the TU, a partition level for the TU, and a number of components of the TU represented by the codeword.

Video decoder 30 may use the decoding context to select the VLC table. In addition, when one of the CBFs for the chrominance components of the TU is coded and another is inferred, and is therefore not jointly coded with the other CBFs, video decoder 30 may select a same VLC table regardless of which CBF is coded and which CBF is inferred. In these examples, the VLC table may include a mapping of codewords to CBF and TSF values. Also, when the TSF for the TU is inferred, and is therefore not jointly coded with the one or more CBFs for the TU, video decoder 30 may select a different VLC table than when the TSF is coded along with the one or more CBFs. Furthermore, video decoder 30 may select a different VLC table depending on a value of the inferred TSF. In these examples, the VLC table may include a mapping of codewords to CBF values.

Using the VLC table, video decoder 30 may determine whether one or more components of the TU include at least one non-zero coefficient, i.e., are coded, and whether the TU is split into sub-TUs, based on the codeword. Moreover, video decoder 30 may update the mapping between the codewords and the CBF and TSF values within the VLC table based on the above determinations to reflect which determinations are more or less likely to occur for the decoding context, e.g., to coordinate the mapping within the VLC table with a mapping in a corresponding VLC table used by video encoder 20 to jointly encode the one or more CBFs and the TSF for the TU.

As one example, video decoder 30 may be configured to decode jointly encoded CBF for a luminance component of the TU, e.g., $CBF_Y$, CBF for both chrominance components of the TU, e.g., $CBF_C$ as previously described, and TSF for the TU. For example, in cases where the component comprises a first chrominance component of the TU, and wherein the TU further comprises a second, different chrominance component, video decoder 30 may be further configured to determine whether at least one of the first chrominance component and the second chrominance component includes at least one non-zero coefficient based on the codeword, i.e., determine the $CBF_C$ for the TU.

In the event the $CBF_C$ value for the TU indicates that at least one of the chrominance components includes at least one non-zero coefficient, video decoder 30 may be further configured to decode additional information indicative of whether each individual chrominance component includes at least one non-zero coefficient. In some examples, however, when the value of one of the two CBFs for the chrominance components can be inferred, video decoder 30 may be configured to not decode the additional information.

According to some examples, to decode the additional information, video decoder 30 may be configured to decode individually encoded CBFs for the chrominance components of the TU. According to other examples, video decoder 30 may be configured to decode jointly encoded CBFs for the chrominance components of the TU in a similar manner as described above with reference to decoding jointly encoded one or more CBFs and a TSF for a TU of a CU of video data.

For example, in cases where at least one of the first chrominance component and the second chrominance component includes at least one non-zero coefficient, to determine whether the first chrominance component includes at least one non-zero coefficient based on the codeword, video decoder 30 may be further configured to, after determining that at least one of the first chrominance component and the second chrominance component includes at least one non-zero coefficient based on the codeword, determine whether the first chrominance component includes at least one non-zero coefficient based on a second, different codeword for the TU. Video decoder 30 may be further configured to determine whether the second chrominance component includes at least one non-zero coefficient based on the second codeword.

In this example, once again, video decoder 30 may be configured to determine a second decoding context for the TU in a manner substantially similar to that used by video encoder 20, as previously described, to select a second VLC table containing the second codeword. For example, the second decoding context may include one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which jointly encoded CBFs and TSFs were previously decoded in the same manner as described herein. In some examples, video decoder 30 may use a same decoding context for selecting both the first VLC table and the second VLC table, in which case the first and second decoding contexts discussed above may comprise the same context.

Video decoder 30 may use the second decoding context to select the second VLC table. For example, the second VLC table may include a mapping of codewords to $CBF_U$ and $CBF_V$ values. Using the second VLC table, video decoder 30 may determine whether each of the chrominance components of the TU includes at least one non-zero coefficient, i.e., is coded, based on the second codeword. Moreover, video decoder 30 may update the mapping between the codewords and the $CBF_U$ and $CBF_V$ values within the second VLC table based on the above determinations to reflect which determinations are more or less likely to occur for the second decoding context, e.g., to coordinate the mapping within the second VLC table with a mapping in a corresponding VLC table used by video encoder 20 to jointly encode the $CBF_U$ and $CBF_V$ for the TU.

As still another example, CBFs or TSFs for sub-TUs of the TU may be jointly coded. For example, where the TU is split into the sub-TUs, video decoder 30 may be configured to determine whether the sub-TUs are split into further sub-TUs based on a second, different codeword for the sub-TUs. Similarly, video decoder 30 may be configured to determine whether a component of the sub-TUs corresponding to the component of the TU includes at least one non-zero coefficient based on the second codeword for the sub-TUs.

In these examples, the second codeword may also comprise a VLC codeword. The second codeword may be used to determine the CBFs or the TSFs for the sub-TUs using a second, different VLC table selected using a second, different decoding context. For example, when decoding jointly encoded TSFs for the sub-TUs, the second decoding context may include values of the CBFs for the sub-TUs, e.g., CBFs corresponding to the Y components of the sub-TUs. Similarly, when decoding jointly encoded CBFs for the sub-TUs, the second decoding context may include values of the TSFs for the sub-TUs.

In any case, video decoder 30 may decode the CU using the one or more CBFs and the TSF for the TU, and/or the CBFs or the TSFs for the sub-TUs, determined using the one or more codewords. Once again, because using the VLC techniques described above may, in the average case, result in the one or more codewords comprising fewer bits than individually coded CBFs and TSFs represented by the codewords, there may be a relative bit savings for a coded bitstream including the codewords when using the techniques of this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Components substantially similar to either or both of video encoder 20 and video decoder 30 may be included in one or more encoders or decoders, either of which may be integrated as part of a combined video encoder/decoder (CODEC). An apparatus including components substantially similar to video encoder 20 and/or video decoder 30 may comprise an integrated circuit, a microprocessor, and/or a wireless communication device, such as a cellular telephone.

In this manner, source device 12 represents an example of an apparatus for encoding video data, including a video encoder configured to determine whether a component of a TU of a CU of video data includes at least one non-zero coefficient, determine whether the TU is split into sub-TUs, select a codeword from a VLC table, wherein the VLC table provides an indication that the codeword corresponds to the determinations, and provide the codeword for the TU.

Similarly, destination device 14 represents an example of an apparatus for decoding video data, including a video decoder configured to determine whether a component of a TU of a CU of video data includes at least one non-zero coefficient based on a codeword for the TU, determine whether the TU is split into sub-TUs based on the codeword, and decode the TU based on the determinations.

Figure 2:
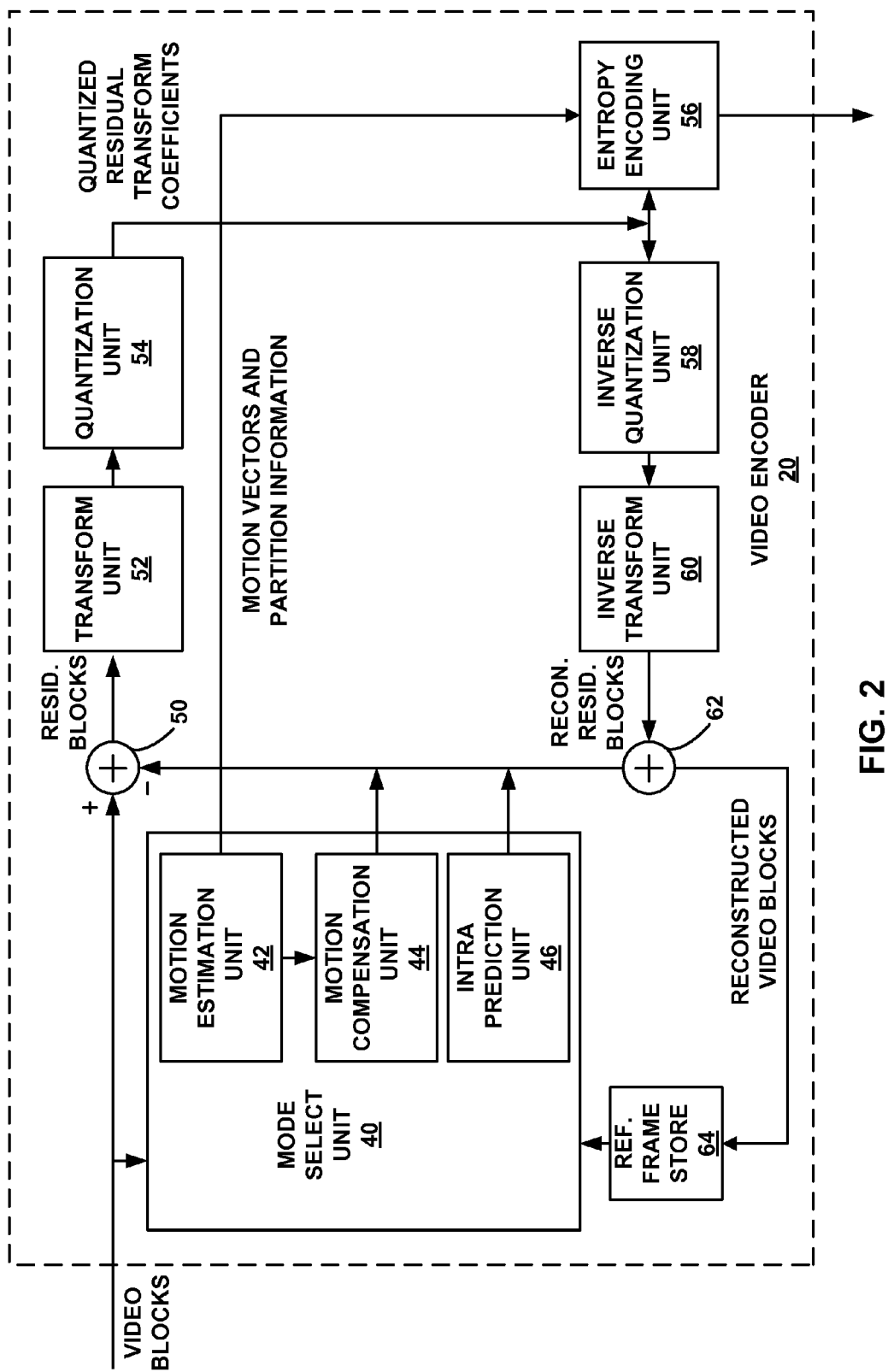
FIG. 2 is a block diagram that illustrates an example of a video encoder that may implement techniques for jointly encoding one or more CBFs and a TSF for a TU of a CU of video data.

FIG. 2 is a block diagram that illustrates an example of a video encoder 20 that may implement techniques for jointly encoding one or more CBFs and a TSF for a TU of a CU of video data. Video encoder 20 may perform intra- and inter-coding of blocks within video frames, such as macroblocks or CUs, and/or partitions or sub-partitions thereof. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes, and inter-modes, such as uni-directional prediction (P-mode) or bi-directional prediction (B-mode), may refer to any of several temporal-based compression modes.

As shown in FIG. 2, video encoder 20 receives a current block of video data within a video frame to be encoded. In the example of FIG. 2, video encoder 20 includes motion compensation unit 44, motion estimation unit 42, intra prediction unit 46, reference frame store 64, summer 50, transform unit 52, quantization unit 54, and entropy encoding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks (e.g., LCUs). Motion estimation unit 42 and motion compensation unit 44 may perform inter-predictive coding of a given received video block relative to one or more blocks in one or more reference frames to provide temporal compression. Intra prediction unit 46 may perform intra-predictive coding of a given received video block relative to one or more neighboring blocks in the same frame or slice as the block to be coded to provide spatially-based prediction values for encoding the block.

Mode select unit 40 may select one of the coding modes, intra or inter, e.g., based on error results and based on a frame or slice type for the frame or slice including the given received block being coded, and provide the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In general, a motion vector may describe motion of a CU, though in some cases (e.g., when a CU is coded using merge mode), the CU may inherit motion information from another CU. Motion compensation may involve fetching or generating the predictive block based on the motion vector determined by motion estimation. Again, motion estimation unit 42 and motion compensation unit 44 may be functionally integrated, in some examples.

Motion estimation unit 42 may calculate a motion vector for a video block of an inter-coded frame by comparing the video block to video blocks of a reference frame in reference frame store 64. Motion compensation unit 44 may also interpolate sub-integer pixels of the reference frame, e.g., an I-frame or a P-frame, for the purposes of this comparison. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists.

Motion estimation unit 42 may compare blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 may send the calculated motion vector to entropy encoding unit 56 and motion compensation unit 44. The reference frame block identified by a motion vector may be referred to as an inter-predictive block, or, more generally, a predictive block. Motion compensation unit 44 may calculate prediction data based on the predictive block.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the current block.

In some examples, mode select unit 40, in conjunction with transform unit 52, and/or other units or components of video encoder 20, may determine TSFs for one or more TUs of an inter-prediction encoded or an intra-prediction encoded CU. For example, the TSFs, representative of partition information for the one or more TUs as described above, may be determined as part of determining partition information for one or more PUs of the CU. Accordingly, TU partition information for the CU may depend on PU partition information for the CU. For example, mode select unit 40, in conjunction with transform unit 52, may determine whether the one or more TUs of the CU are each split into sub-TUs as part of generating prediction data for the CU. Additionally, whether the one or more TUs are each split into the sub-TUs may also depend on properties of transform unit 52, e.g., maximum and minimum transform sizes for the CU. Furthermore, entropy encoding unit 56 may determine CBFs for the one or more TUs. For example, entropy encoding unit 56 may determine whether a component of each of the one or more TUs includes at least one non-zero coefficient, i.e., is coded, as part of generating syntax information used to encode the CU. In still other examples, other units or components of video encoder 20 may determine the CBFs and the TSFs for the one or more TUs of the CU.

In any case, video encoder 20 may perform a rate-distortion optimization process to determine appropriate CU, PU, and TU partitioning schemes, and encode the CU using the determined partitioning schemes. Video encoder 20 may also determine values for the CBFs and the TSFs for the one or more TUs of the CU, in some examples. Mode select unit 40, in conjunction with transform unit 52, may provide the TSFs to entropy encoding unit 56, which may also generate the CBFs.

In accordance with the techniques of this disclosure, as described in greater detail below, entropy encoding unit 56 may jointly encode one or more CBFs and a TSF for a TU of the CU. Also in accordance with the techniques of this disclosure, entropy encoding unit 56 may jointly encode CBFs or TSFs for sub-TUs of a TU of the CU.

After predicting a current block, e.g., using intra-prediction or inter-prediction, video encoder 20 may form a residual video block by subtracting the prediction data calculated by motion compensation unit 44 or intra-prediction unit 46 from the original video block being coded. Summer 50 represents the component or components that may perform this subtraction operation. Transform unit 52 may apply a transform, such as a discrete cosine transform (DCT) or a conceptually similar transform, to the residual block, producing a video block comprising residual transform coefficient values. Transform unit 52 may perform other transforms, such as those defined by the H.264 standard or used in HEVC, which are conceptually similar to DCT. Wavelet transforms, integer transforms, sub-band transforms, Karhunen-Loeve Transforms (KLTs), directional transforms, or other types of transforms could also be used. In any case, transform unit 52 may apply the transform to the residual block, producing a block of residual transform coefficients. The transform may convert the residual information from a pixel domain to a transform domain, such as a frequency domain. Quantization unit 54 may quantize the residual transform coefficients to further reduce bit rate. The quantization process may reduce the bit depth associated with some or all of the coefficients. The degree of quantization may be modified by adjusting a quantization parameter.

Following quantization, entropy encoding unit 56 may entropy code the quantized transform coefficients. For example, entropy encoding unit 56 may perform context adaptive variable length coding (CAVLC), context adaptive binary arithmetic coding (CABAC), or another entropy coding technique. Following the entropy coding by entropy encoding unit 56, the encoded video may be transmitted to another device or archived for later transmission or retrieval. In the case of CABAC, context may be based on neighboring blocks and/or block sizes. In the case of CAVLC, context may be based on various characteristics of a coded block of video data and of previously coded neighboring blocks.

In some cases, entropy encoding unit 56 or another unit of video encoder 20 may be configured to perform other coding functions, in addition to entropy coding as described above. For example, entropy encoding unit 56 may be configured to determine CBP values for blocks of video data and partitions thereof. Also, in some cases, entropy encoding unit 56 may perform run length coding of the coefficients in a block. In particular, entropy encoding unit 56 may apply a zig-zag scan or other scan pattern to scan the transform coefficients in a block and encode runs of zeros for further compression. Entropy encoding unit 56 also may construct header information with appropriate syntax elements for transmission in the encoded video bitstream. According to some coding standards, such as HEVC, such syntax elements may include one or more CBFs and a TSF for a TU of a CU of video data, e.g., represented using an RQT, as previously described.

In accordance with the techniques of this disclosure, one or more CBFs and a TSF for a TU of a CU of video data may be jointly coded. As one example, entropy encoding unit 56 may encode blocks of video data (e.g., one or more CUs). Entropy encoding unit 56 may be configured to determine whether a component of a TU of a CU of video data includes at least one non-zero coefficient, determine whether the TU is split into sub-TUs, select a codeword from a VLC table, wherein the VLC table provides an indication that the codeword corresponds to the determinations, and provide the codeword for the TU. In this example, entropy encoding unit 56 may be further configured to send the codeword into a bitstream.

Entropy encoding unit 56 may be further configured to determine an encoding context for the TU used to select the particular VLC table. The context may include various characteristics of the TU, e.g., one or more of the following: a prediction mode for a PU corresponding to the TU, a partition level for the TU, and a number of components of the TU to be represented by the codeword.

Entropy encoding unit 56 may use the encoding context to select the VLC table. In addition, when one of the CBFs for the chrominance components of the TU is coded and another is inferred, and is therefore not jointly coded with the other CBF, entropy encoding unit 56 may select a same VLC table regardless of which CBF is coded and which CBF is inferred. In these examples, the VLC table may include a mapping of codewords to CBF and TSF values. Also, when the TSF for the TU is inferred, and is therefore not jointly coded with the one or more CBFs for the TU, entropy encoding unit 56 may select a different VLC table than when the TSF is coded along with the one or more CBFs. Furthermore, entropy encoding unit 56 may select a different VLC table depending on a value of the inferred TSF. In these examples, the VLC table may include a mapping of codewords to CBF values.

Entropy encoding unit 56 may further select the codeword that corresponds to the one or more CBFs and the TSF for the TU from the VLC table. Finally, entropy encoding unit 56 may provide the codeword for the TU. Once again, in this example, entropy encoding unit 56 may be further configured to send the codeword into a bitstream.

Additionally, for the VLC table, entropy encoding unit 56 may update the mapping of the codewords to the CBF and TSF values based on the above determinations to reflect which determinations are more or less likely to occur for the encoding context. For example, entropy encoding unit 56 may keep track of how often each combination of CBF and TSF values occurs for the encoding context, and set codewords associated with each combination such that the codewords have lengths that are inversely proportional to the likelihood of the corresponding combinations.

As one such example, entropy encoding unit 56 may be configured to jointly encode a CBF for a luminance component of the TU, a CBF for both chrominance components of the TU, e.g., $CBF_C$ as previously described, and a TSF for the TU. For example, in cases where the component comprises a first chrominance component of the TU, and wherein the TU further comprises a second, different chrominance component, entropy encoding unit 56 may be further configured to determine whether the second chrominance component includes at least one non-zero coefficient. In this example, to select the codeword from the VLC table, entropy encoding unit 56 may be configured to select the codeword such that the VLC table provides an indication that the codeword represents whether at least one of the first chrominance component and the second chrominance component includes at least one non-zero coefficient, i.e., represents the $CBF_C$ for the TU.

In the event the $CBF_C$ value for the TU indicates that at least one of the chrominance components includes at least one non-zero coefficient, entropy encoding unit 56 may be further configured to encode additional information indicative of whether each individual chrominance component includes at least one non-zero coefficient. In some examples, however, when the value of one of the two CBFs for the chrominance components can be inferred, entropy encoding unit 56 may be configured to not encode the additional information.

According to some examples, to code the additional information, entropy encoding unit 56 may be configured to encode the CBFs for the chrominance components of the TU individually. According to other examples, entropy encoding unit 56 may be configured to jointly encode the CBFs for the chrominance components of the TU in a similar manner as described above with reference to jointly encoding one or more CBFs and a TSF for a TU of a CU of video data. For example, in cases where at least one of the first chrominance component and the second chrominance component includes at least one non-zero coefficient, entropy encoding unit 56 may be further configured to select a second, different codeword from a second, different VLC table, wherein the second VLC table provides an indication that the second codeword represents whether the first chrominance component includes at least one non-zero coefficient, and whether the second chrominance component includes at least one non-zero coefficient. Entropy encoding unit 56 may be further configured to provide the second codeword for the TU. In this example, entropy encoding unit 56 may be further configured to send the second codeword into a bitstream.

In this example, once again, entropy encoding unit 56 may be configured to determine a second, different encoding context for the TU used to select the second VLC table. The context may include one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which CBFs and TSFs were previously jointly encoded in the same manner as described herein. In some examples, entropy encoding unit 56 may use a same encoding context for selecting both the first VLC table and the second VLC table, in which case the first and second encoding contexts discussed above may comprise the same context.

Once again, entropy encoding unit 56 may use the second encoding context to select the second VLC table. For example, the second VLC table may include a mapping of codewords to $CBF_U$ and $CBF_V$ values. Entropy encoding unit 56 may further select the second codeword that corresponds to the chrominance CBFs, i.e., the $CBF_U$ and $CBF_V$, for the TU from the second VLC table. Finally, entropy encoding unit 56 may provide the second codeword for the TU. Once again, in this example, entropy encoding unit 56 may be further configured to send the second codeword into a bitstream.

Additionally, once again, for the second VLC table, entropy encoding unit 56 may update the mapping of the codewords to the $CBF_U$ and $CBF_V$ values based on the above determinations to reflect which determinations are more or less likely to occur for the second encoding context. For example, entropy encoding unit 56 may keep track of how often each combination of $CBF_U$ and $CBF_V$ values occurs for the second encoding context, and set codewords associated with each combination such that the codewords have lengths that are inversely proportional to the likelihood of the corresponding combinations.

As still another example, CBFs or TSFs for sub-TUs of the TU may be jointly coded. For example, where the TU is split into the sub-TUs, entropy encoding unit 56 may be further configured to select a second, different codeword representative of whether the sub-TUs are split into further sub-TUs, and provide the second codeword for the sub-TUs. Similarly, entropy encoding unit 56 may select the second codeword such that it represents whether components of the sub-TUs corresponding to the component of the TU include at least one non-zero coefficient, i.e., are coded, and provide the second codeword for the sub-TUs. In these examples, entropy encoding unit 56 may be further configured to send the second codeword into a bitstream.

In these examples, the second codeword may also comprise a VLC codeword. The second codeword may be selected from a second, different VLC table using a second, different encoding context. For example, when jointly encoding the TSFs for the sub-TUs, the second encoding context may include values of the CBFs for the sub-TUs, e.g., CBFs corresponding to the Y components of the sub-TUs. Similarly, when jointly encoding the CBFs for the sub-TUs, the second encoding context may include values of the TSFs for the sub-TUs.

Tables 1-5 illustrate examples of VLC tables that may be used in accordance with the techniques of this disclosure. The VLC table of Table 1 includes a mapping of CBF and TSF values for a TU of a CU of video data (shown in columns "CBFs and TSF for a TU of a CU"), to VLC codewords (shown in column "Codeword") used to represent the corresponding CBF and TSF values. The VLC table of Table 2 includes a mapping of $CBF_Y$, $CBF_C$, and TSF values for a TU of a CU of video data (shown in columns "$CBF_Y$, $CBF_C$, and TSF for a TU of a CU"), to VLC codewords (shown in column "Codeword") used to represent the corresponding $CBF_Y$, $CBF_C$, and TSF values. The VLC table of Table 3 includes a mapping of $CBF_U$ and $CBF_V$ values for a TU of a CU of video data (shown in columns "$CBF_U$ and $CBF_V$ for a TU of a CU"), to VLC codewords (shown in column "Codeword") used to represent the corresponding $CBF_U$ and $CBF_V$ values. Finally, the VLC tables of Table 4 and Table 5 include mappings of CBF and TSF values, respectively, for four sub-TUs of a TU of a CU (shown in columns "CBFs for sub-TUs of a TU of a CU" and "TSFs for sub-TUs of a TU of a CU"), to VLC codewords (shown in respective columns "Codeword") also used to represent the corresponding CBF or TSF values.

It should be noted that each of Table 1, Table 2, Table 4, and Table 5 includes only an excerpt from, or a subset of, a full VLC table. As one example a full VLC table for each of Table 1 and Table 5 would ordinarily include up to 16 different entries of CBF and/or TSF value combinations mapped to a corresponding number of different VLC codewords to represent all possible CBF and/or TSF value combinations for the TU, or the sub-TUs. As another example, a full VLC table of Table 2 would ordinarily include up to 8 different entries of CBF and TSF value combinations mapped to a corresponding number of different VLC codewords, also to represent all possible CBF and TSF value combinations for the TU. As yet another example, a full VLC table of Table 4 would ordinarily include up to 15 different entries of CBF value combinations mapped to a corresponding number of different VLC codewords, to represent all possible CBF value combinations for the sub-TUs. In this example, the CBF value combination corresponding to all four CBFs, e.g., for a component of each of the four sub-TUs, being zero is excluded from Table 4 because this combination can be indicated by a CBF for a corresponding component of the parent TU of the sub-TUs.

In the example of Table 1, it is assumed that each codeword represents three CBFs and one TSF for a TU of a CU of video data. In other examples, as described above, more or fewer CBFs and TSFs may be represented (e.g., a subset of $CBF_Y$, $CBF_U$, and $CBF_V$, or more than one TSF for a TU of a CU). Accordingly, the number of codewords in Table 1 may vary based on the number of CBFs and TSFs which are jointly encoded. In this manner, Table 1 may have more or fewer entries than shown in this example. Additionally, in the example of Table 1, with reference to columns "CBFs and TSF for a TU of a CU," a CBF value of "1" indicates that the corresponding component includes at least one non-zero coefficient, i.e., is coded, and a value of "0" indicates that the component does not include any non-zero coefficients, i.e., is not coded. Furthermore, a TSF value of "1" indicates that the TU is split into sub-TUs, and a value of "0" indicates that the TU is not split. In other examples, different values may be used in Table 1 to indicate whether a component of a TU is coded, and whether the TU is split into sub-TUs.

TABLE 1

| CBFs and TSF for a TU of a CU | | | | |
|---|---|---|---|---|
| $CBF_Y$ | $CBF_U$ | $CBF_V$ | TSF | Codeword |
| 1 | 1 | 1 | 1 | 1 |
| 0 | 1 | 1 | 0 | 01 |
| ... | ... | ... | ... | ... |

With reference to the example of Table 1, suppose that for a TU of a CU of video data, all components (i.e., Y, U, and V components) of the TU include at least one non-zero coefficient, (and are thus coded), and that the TU is split into sub-TUs. In this example, assuming that a component of a TU of a CU including at least one non-zero coefficient (that is, a coded component of the TU) is indicated with a CBF value of "1," and that a TU being split into sub-TUs is indicated with a TSF value of "1," as previously described, mode select unit 40, in conjunction with transform unit 52, may provide a TSF for the TU having a value of "1" to entropy encoding unit 56. Additionally, entropy encoding unit 56 may determine CBFs for the TU, each CBF also having a value of "1," as part of generating syntax information used to encode the CU. The example of Table 1 is further premised on the assumption that the case where all components of the TU are coded (that is, include at least one non-zero coefficient), and where the TU is split into sub-TUs, is the most likely case for the TU given the encoding context (i.e., the context that was used to select the VLC table depicted in Table 1). Accordingly, in this example, entropy encoding unit 56 would select the codeword "1" to represent the one or more CBFs and the TSF for the TU.

In the example of Table 2, it is assumed that each codeword represents a $CBF_Y$, a $CBF_C$, and a TSF for a TU of a CU of video data. In other examples, more or fewer CBFs and TSFs may be represented (e.g., only a $CBF_C$ and a TSF for a TU of a CU). Accordingly, the number of codewords in Table 2 may once again vary based on the number of CBFs and TSFs which are jointly encoded, and Table 2 may have more or fewer entries than shown in this example. Once again, in the example of Table 2, with reference to columns "$CBF_Y$, $CBF_C$, and TSF for a TU of a CU," a CBF value of "1" indicates that the corresponding component is coded, and a value of "0" indicates that the component is not coded. Specifically, a $CBF_C$ value of "1" indicates that at least one of the chrominance components of the TU is coded, and a value of "0" indicates that the chrominance components are not coded. Furthermore, a TSF value of "1" indicates that the TU is split into sub-TUs, and a value of "0" indicates that the TU is not split. Once again, in other examples, different values may be used in Table 2 to indicate whether a component of a TU is coded, and whether the TU is split into the sub-TUs.

TABLE 2

CBF$_Y$, CBF$_C$, and TSF for a TU of a CU

| CBF$_Y$ | CBF$_C$ | TSF | Codeword |
|---|---|---|---|
| 1 | 1 | 1 | 1 |
| 1 | 0 | 1 | 01 |
| ... | ... | ... | ... |

With reference to the example of Table 2, suppose that for a TU of a CU of video data, the luminance component (i.e., the Y component) and at least one of the chrominance components (i.e., the U and V components) of the TU include at least one non-zero coefficient, and that the TU is split into sub-TUs. In this example, assuming that a luminance component of a TU of a CU including at least one non-zero coefficient, and at least one of the chrominance components of the TU including at least one non-zero coefficient, are each indicated with a corresponding CBF value of "1," and that a TU being split into sub-TUs is indicated with a TSF value of "1," as previously described, mode select unit 40, in conjunction with transform unit 52, may provide a TSF for the TU having a value of "1" to entropy encoding unit 56. Additionally, entropy encoding unit 56 may determine a CBF$_Y$ and a CBF$_C$ for the TU, each CBF also having a value of "1," as part of generating syntax information used to encode the CU. The example of Table 2 is further premised on the assumption that the case where the luminance component and at least one of the chrominance components of the TU include at least one non-zero coefficient, and where the TU is split into sub-TUs, is the most likely case for the TU given the "first" encoding context (i.e., the encoding context that was used to select the VLC table depicted in Table 2). Accordingly, in this example, entropy encoding unit 56 would select the codeword "1" to represent the CBF$_Y$, the CBF$_C$, and the TSF for the TU, which may be referred to as a first codeword in this example.

In the example of Table 2, in the event the CBF$_C$ value for the TU indicates that at least one of the chrominance components includes at least one non-zero coefficient (e.g., CBF$_C$="1"), entropy encoding unit 56 may be further configured to encode additional information indicative of whether each individual chrominance component includes at least one non-zero coefficient, as illustrated in the example of Table 3 described in greater detail below. In some examples, however, as previously described, when the value of one of the two CBFs for the chrominance components can be inferred, entropy encoding unit 56 may be configured to not encode the additional information.

According to the example of Table 3, to code the additional information, entropy encoding unit 56 may be configured to jointly encode the CBFs for the chrominance components of the TU. In the example of Table 3, it is assumed that each codeword represents a CBF$_U$ and a CBF$_V$ for a TU of a CU of video data. Once again, in the example of Table 3, with reference to columns "CBF$_U$ and CBF$_V$ for a TU of a CU," a CBF value of "1" indicates that the corresponding component includes at least one non-zero coefficient, and a value of "0" indicates that the component does not include any non-zero coefficients. Once again, in other examples, different values may be used in Table 3 to indicate whether a chrominance component of a TU includes at least one non-zero coefficient.

TABLE 3

CBF$_U$ and CBF$_V$ for a TU of a CU

| CBF$_U$ | CBF$_V$ | Codeword |
|---|---|---|
| 0 | 1 | 01 |
| 1 | 0 | 00 |
| 1 | 1 | 1 |

With reference to the example of Table 3, suppose that for a TU of a CU of video data, both of the chrominance components (i.e., the U and V components) of the TU include at least one non-zero coefficient. In this example, assuming that a chrominance component of a TU of a CU including at least one non-zero coefficient is indicated with a corresponding CBF value of "1," as previously described, entropy encoding unit 56 may determine a CBF$_U$ and a CBF$_V$ for the TU, each CBF having a value of "1," as part of generating syntax information used to encode the CU. The example of Table 3 is further premised on the assumption that the case where both chrominance components of the TU include at least one non-zero coefficient is the most likely case for the TU given the "second" encoding context (i.e., the encoding context that was used to select the VLC table depicted in Table 3). Accordingly, in this example, entropy encoding unit 56 would select the codeword "1" to represent the CBF$_U$ and the CBF$_V$ for the TU, which may be referred to as a second codeword in this example.

TABLE 4

CBFs for sub-TUs of a TU of a CU

| CBF | CBF | CBF | CBF | Codeword |
|---|---|---|---|---|
| 1 | 1 | 1 | 1 | 1 |
| 1 | 1 | 0 | 0 | 01 |
| ... | ... | ... | ... | ... |

TABLE 5

TSFs for sub-TUs of a TU of a CU

| TSF | TSF | TSF | TSF | Codeword |
|---|---|---|---|---|
| 1 | 1 | 1 | 1 | 1 |
| 0 | 0 | 0 | 0 | 01 |
| ... | ... | ... | ... | ... |

Finally, with reference to the examples of Table 4 and Table 5, suppose that for four sub-TUs of a TU of a CU of video data, a component (e.g., Y, U, or V) of each of the sub-TUs includes at least one non-zero coefficient, or that the sub-TUs are each split into further sub-TUs. In this example, once again assuming that a component of a TU of a CU including at least one non-zero coefficient is indicated with a CBF value of "1," and that a TU being split into sub-TUs is indicated with a TSF value of "1," as previously described, mode select unit 40, in conjunction with transform unit 52, may provide the TSFs for the sub-TUs, each having a value of "1," to entropy encoding unit 56. Alternatively, entropy encoding unit 56 may determine the CBFs for the sub-TUs corresponding to the component, each CBF also having a value of "1," as part of generating syntax information used to encode the CU.

In the case of jointly encoding CBFs for the sub-TUs, once again assuming that the case where the particular component of each of the sub-TUs corresponding to the CBFs includes at least one non-zero coefficient is the most likely case for the sub-TUs given the encoding context, entropy encoding unit 56 may select the shortest codeword from Table 4. In the case of jointly encoding the TSF for the sub-TUs, once again assuming that the case where the sub-TUs are split into the further sub-TUs is the most likely case for the sub-TUs given the encoding context, entropy encoding unit 56 may also select the shortest codeword from Table 5. In any case, in this example, entropy encoding unit 56 would select the codeword "1" to represent the CBFs or the TSFs for the sub-TUs.

Referring briefly to video decoder 30 of FIG. 3, which is discussed in greater detail below, video decoder 30 may ultimately receive a codeword "1," corresponding to any one of the codewords selected by video encoder 20 in the examples of Tables 1-5. Accordingly, video decoder 30 may decode the codeword using a substantially similar VLC table as the VLC table depicted in Table 1 or Table 2, and, in some cases, Table 3, to determine the one or more CBFs and the TSF for the TU. Similarly, video decoder 30 may decode the codeword using a substantially similar VLC table as the VLC table depicted in Table 4 or Table 5 to determine the CBFs or the TSFs, respectively, for the sub-TUs of the TU of the CU.

As one example, using Table 1, video decoder 30 may determine that all components (i.e., Y, U, and V components) of the TU include at least one non-zero coefficient, and that the TU is split into sub-TUs based on the codeword. Similarly, using Table 2 or Table 3, video decoder 30 may determine that the luminance component (i.e., the Y component) and at least one of the chrominance components (i.e., the U and V components) of the TU include at least one non-zero coefficient, and that the TU is split into sub-TUs, or that both of the chrominance components include at least one non-zero coefficient, respectively, based on the codeword. As another example, using Table 4, video decoder 30 may determine that a component (e.g., Y, U, or V component) of each of the sub-TUs includes at least one non-zero coefficient based on the codeword. Similarly, using Table 5, video decoder 30 may determine that the sub-TUs are each split into further sub-TUs based on the codeword. In these examples, a bit savings may be achieved, due to the codeword comprising a single bit, rather than two to four bits used to individually indicate the one or more CBFs and/or the TSF for the TU (e.g., the $CBF_Y$, the $CBF_U$, the $CBF_V$, and the TSF, or the $CBF_U$ and the $CBF_V$, for the TU), and the CBFs or the TSFs for the sub-TUs, as previously described.

It should be understood that Tables 1-5 are merely examples of VLC tables used to encode one or more CBFs and a TSF for a TU of a CU, and CBFs or TSFs for sub-TUs of a TU of a CU. The mappings of the VLC tables in Tables 1-5 are provided as examples of some of many possible mappings that may exist for VLC tables used according to the techniques of this disclosure.

As shown in the VLC table of Table 1, the CBF and TSF values corresponding to all components of a TU of a CU including at least one non-zero coefficient, and to the TU being split into sub-TUs, are mapped to a shortest codeword in the VLC table. Similarly, as shown in the VLC table of Table 2, the CBF and TSF values corresponding to a luminance component and at least one of the chrominance components of a TU of a CU including at least one non-zero coefficient, and to the TU being split into sub-TUs, are mapped to a shortest codeword in the VLC table. Furthermore, as shown in the VLC table of Table 3, the CBF values corresponding to both chrominance components of the TU including at least one non-zero coefficient are mapped to a shortest codeword in the VLC table. Finally, as shown in the VLC tables of Table 4 and Table 5, the CBF values corresponding to a component of all sub-TUs of a TU of a CU including at least one non-zero coefficient, and the TSF values corresponding to sub-TUs of a TU of a CU being split into further sub-TUs, are mapped to a shortest codeword in the respective VLC table. In each of the above examples, the particular mapping indicates that the corresponding CBF and/or TSF values are determined to be the most likely values among the possibilities defined by the VLC table for the encoding context. In other examples, other CBF and TSF values may be determined to be the most likely. For example, CBF values indicating that all components of a TU of a CU do not include any non-zero coefficients, and a TSF value indicating that the TU is not split into sub-TUs may be determined to be the most likely. Similarly, CBF values indicating that a component of each of the sub-TUs of a TU of a CU does not include any non-zero coefficients, or TSF values indicating that each of sub-TUs of a TU of a CU is not split into further sub-TUs, may also be determined to be the most likely.

Moreover, different VLC tables may provide different mappings, based on the encoding context for the TU and the sub-TUs. Accordingly, for different VLC tables selected, the corresponding mapping, indicating relative likelihoods of different CBF and/or TSF values, may vary, and, for a given VLC table selected, the mapping may be continuously updated based on CBF and/or TSF values for other TUs of the CU, and TUs of one or more previously encoded CUs.

In some examples, multiple encoding contexts determined for the TU, or for the sub-TUs, as described above, may correspond to a common VLC table, e.g., any one of Tables 1-5. Accordingly, different encoding contexts may nevertheless result in using a common VLC table for coding one of more CBFs and a TSF for a TU, or CBFs or TSFs for sub-TUs of a TU, which may reduce system complexity and coding resources.

For purposes of example, Tables 1-5 above utilize unary codewords to represent one or more CBFs and a TSF for a TU of a CU, and CBFs or TSFs for sub-TUs of the TU. However, other types of variable length codes may be used in other examples, e.g., Exponential-Golomb, or other Huffman codes, or arithmetic codes. In some examples, certain codewords in Tables 1-5 may have similar bit-lengths, e.g., when probabilities of CBF and/or TSF values corresponding to each codeword are approximately the same. Furthermore, any set of codewords may be used for Tables 1-5, so long as each of the codewords is uniquely decodable (e.g., none of the codewords is a prefix of another codeword in the same table).

Video encoder 20 may encode the CU to include the one or more CBFs and the TSF for the TU, and/or the CBFs or the TSFs for the sub-TUs, using the one or more codewords. For example, entropy encoding unit 56 may include the one or more codewords as part of encoded syntax information for the CU, as described above. Because using the VLC coding techniques described above may, in the average case, result in the one or more codewords comprising fewer bits than individually coded CBFs and TSFs represented by the codewords, there may be a relative bit savings for a coded bitstream including the codewords when using the techniques of this disclosure.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, video encoder 20 of FIG. 2 represents an example of an apparatus for encoding video data, including a video encoder configured to determine whether a component of a TU of a CU of video data includes at least one non-zero coefficient, determine whether the TU is split into sub-TUs, select a codeword from a VLC table, wherein the VLC table provides an indication that the codeword corresponds to the determinations, and provide the codeword for the TU.

Figure 3:
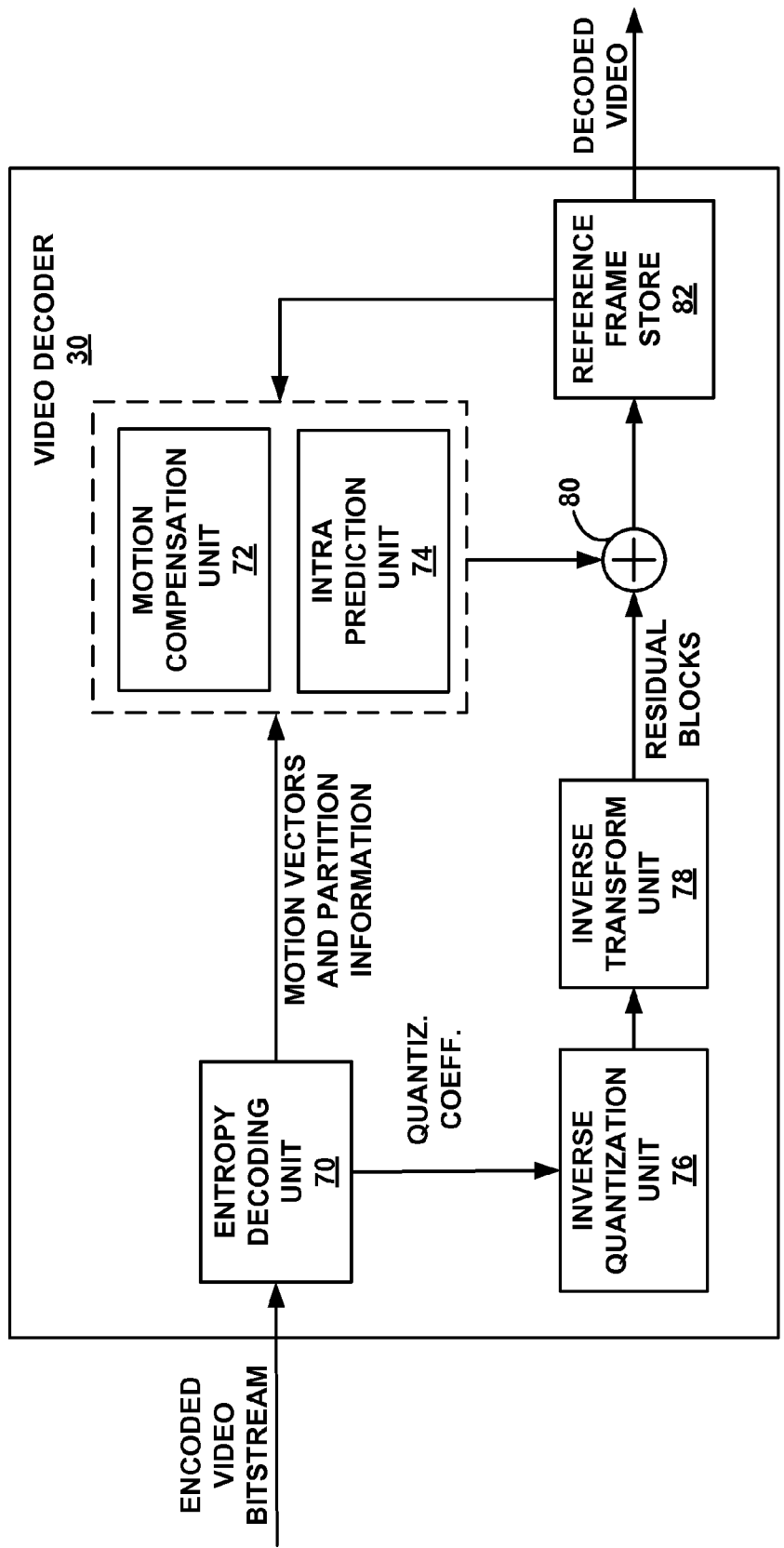
FIG. 3 is a block diagram that illustrates an example of a video decoder that may implement techniques for decoding jointly encoded one or more CBFs and a TSF for a TU of a CU of video data.

FIG. 3 is a block diagram that illustrates an example of a video decoder 30 that may implement techniques for decoding jointly encoded one or more CBFs and a TSF for a TU of a CU of video data. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra prediction unit 74 may generate prediction data based on an intra-prediction mode received from entropy decoding unit 70 for a corresponding CU.

Video decoder 30 may receive encoded video data (e.g., one or more CUs) encoded by, e.g., video encoder 20. Alternatively, video decoder 30 may receive encoded video data from a storage medium, such as a CD-ROM, Blu-Ray disc, flash drive, hard drive, or other storage medium. Once again, as one example, one or more CBFs and a TSF for a TU of a CU of video data may be jointly coded. In accordance with the techniques of this disclosure, entropy decoding unit 70 may be configured to determine whether a component of a TU of a CU of video data includes at least one non-zero coefficient based on a codeword for the TU, determine whether the TU is split into sub-TUs based on the codeword, and decode the TU based on the determinations.

In some examples, entropy decoding unit 70 may be configured to determine a decoding context for the TU in a manner substantially similar to that used by entropy encoding unit 56, as previously described with reference to FIG. 2, to select a particular VLC table containing the codeword. For example, the decoding context may include various characteristics of the TU, e.g., one or more of the following: a prediction mode for a PU corresponding to the TU, a partition level for the TU, and a number of components of the TU represented by the codeword.

Entropy decoding unit 70 may use the decoding context to select the VLC table. In addition, when one of the CBFs for the chrominance components of the TU is coded and another is inferred, and is therefore not jointly coded with the other CBF, entropy decoding unit 70 may select a same VLC table regardless of which CBF is coded and which CBF is inferred. In these examples, the VLC table may include a mapping of codewords to CBF and TSF values. Also, when the TSF for the TU is inferred, and is therefore not jointly coded with the one or more CBFs for the TU, entropy decoding unit 70 may select a different VLC table than when the TSF is coded along with the one or more CBFs. Furthermore, entropy decoding unit 70 may select a different VLC table depending on a value of the inferred TSF. In these examples, the VLC table may include a mapping of codewords to CBF values.

Using the VLC table, entropy decoding unit 70 may determine whether one or more components of the TU include at least one non-zero coefficient, i.e., are coded, and whether the TU is split into sub-TUs, based on the codeword. Moreover, entropy decoding unit 70 may update the mapping between the codewords and the CBF and TSF values within the VLC table based on the above determinations to reflect which determinations are more or less likely to occur for the decoding context, e.g., to coordinate the mapping within the VLC table with a mapping in a corresponding VLC table used by video encoder 20 to jointly encode the one or more CBFs and the TSF for the TU.

Once again, as one example, entropy decoding unit 70 may be configured to decode jointly encoded CBF for a luminance component of the TU, e.g., $CBF_Y$, CBF for both chrominance components of the TU, e.g., $CBF_C$ as previously described, and TSF for the TU. For example, in cases where the component comprises a first chrominance component of the TU, and wherein the TU further comprises a second, different chrominance component, entropy decoding unit 70 may be further configured to determine whether at least one of the first chrominance component and the second chrominance component includes at least one non-zero coefficient based on the codeword, i.e., determine the $CBF_C$ for the TU.

Once again, in the event the $CBF_C$ value for the TU indicates that at least one of the chrominance components includes at least one non-zero coefficient, entropy decoding unit 70 may be further configured to decode additional information indicative of whether each individual chrominance component includes at least one non-zero coefficient. In some examples, however, when the value of one of the two CBFs for the chrominance components can be inferred, entropy decoding unit 70 may be configured to not decode the additional information.

According to some examples, to decode the additional information, entropy decoding unit 70 may be configured to decode individually encoded CBFs for the chrominance components of the TU. According to other examples, entropy decoding unit 70 may be configured to decode jointly encoded CBFs for the chrominance components of the TU in a similar manner as described above with reference to decoding jointly encoded one or more CBFs and a TSF for a TU of a CU of video data.

For example, in cases where at least one of the first chrominance component and the second chrominance component includes at least one non-zero coefficient, to determine whether the first chrominance component includes at least one non-zero coefficient based on the codeword, entropy decoding unit 70 may be further configured to, after determining that at least one of the first chrominance component and the second chrominance component includes at least one non-zero coefficient based on the codeword, determine whether the first chrominance component includes at least one non-zero coefficient based on a second, different codeword for the TU. Entropy decoding unit 70 may be further configured to determine whether the second chrominance component includes at least one non-zero coefficient based on the second codeword.

In this example, once again, entropy decoding unit 70 may be configured to determine a second decoding context for the TU in a manner substantially similar to that used by entropy encoding unit 56, as previously described, to select a second VLC table containing the second codeword. For example, the second decoding context may include one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which jointly encoded CBFs and TSFs were previously decoded in the same manner as described herein. In some examples, entropy decoding unit 70 may use a same decoding context for selecting both the first VLC table and the second VLC table, in which case the first and second encoding contexts discussed above may comprise the same context.

Once again, entropy decoding unit 70 may use the second decoding context to select the second VLC table. For example, the second VLC table may include a mapping of codewords to $CBF_U$ and $CBF_V$ values. Using the second VLC table, entropy decoding unit 70 may determine whether each of the chrominance components of the TU includes at least one non-zero coefficient, i.e., is coded, based on the second codeword. Moreover, entropy decoding unit 70 may update the mapping between the codewords and the $CBF_U$ and $CBF_V$ values within the second VLC table based on the above determinations to reflect which determinations are more or less likely to occur for the second decoding context, e.g., to coordinate the mapping within the second VLC table with a mapping in a corresponding VLC table used by entropy encoding unit 56 to jointly encode the $CBF_U$ and $CBF_V$ for the TU.

Once again, as still another example, CBFs or TSFs for sub-TUs of the TU may be jointly coded. For example, where the TU is split into the sub-TUs, entropy decoding unit 70 may be further configured to determine whether the sub-TUs are split into further sub-TUs based on a second, different codeword for the sub-TUs. Similarly, entropy decoding unit 70 may be configured to determine whether a component of the sub-TUs corresponding to the component of the TU includes at least one non-zero coefficient based on the second codeword for the sub-TUs.

Once again, in these examples, the second codeword may also comprise a VLC codeword. The second codeword may be used to determine the CBFs or the TSFs for the sub-TUs using a second, different VLC table selected using a second, different decoding context. For example, when decoding jointly encoded TSFs for the sub-TUs, the second decoding context may include values of the CBFs for the sub-TUs, e.g., CBFs corresponding to the Y components of the sub-TUs. Similarly, when decoding jointly encoded CBFs for the sub-TUs, the second decoding context may include values of the TSFs for the sub-TUs.

As an example, again with reference to the VLC tables of Tables 1-5 of FIG. 2, suppose that a codeword for a TU of a CU of video data received by entropy decoding unit 70 comprises "1." In this example, entropy decoding unit 70 may use the codeword and the VLC tables depicted in Table 1, or Table 2, and, in some cases, Table 3, to determine one or more CBFs and a TSF for the TU. In particular, in this example, Table 1 indicates that the codeword corresponds to all components (i.e., Y, U, and V components) of the TU including at least one non-zero coefficient, and the TU being split into sub-TUs. Accordingly, entropy decoding unit 70 may determine that, for a TU of a CU having a decoding context corresponding to Table 1, and for a codeword received for the TU having the value "1," that all components of the TU include at least one non-zero coefficient, and that the TU is split into sub-TUs.

Similarly, suppose that the codeword received by entropy decoding unit 70 comprises a first codeword for the TU. In this example, Table 2 indicates that the codeword corresponds to a luminance component (i.e., the Y component) and at least one of the chrominance components (i.e., the U and V components) of the TU including at least one non-zero coefficient, and the TU being split into sub-TUs. Accordingly, entropy decoding unit 70 may determine that, for a TU of a CU having a decoding context corresponding to Table 2, and for a first codeword received for the TU having the value "1," that the luminance component, and at least one of the chrominance components of the TU include at least one non-zero coefficient, and that the TU is split into sub-TUs.

Furthermore, in this example, suppose that a second codeword for the TU received by entropy decoding unit 70 also comprises "1." Table 3 indicates that the second codeword corresponds to both chrominance components (i.e., the U and V components) of the TU including at least one non-zero coefficient. Accordingly, entropy decoding unit 70 may determine that, for a TU of a CU having a decoding context corresponding to Table 3, and for a second codeword received for the TU having the value "1," that both of the chrominance components of the TU include at least one non-zero coefficient.

As another example, suppose that a codeword for sub-TUs of a TU of a CU of video data received by entropy decoding unit 70 comprises "1." In this example, Table 4 indicates that the codeword corresponds to a component (e.g., Y, U, or V component) of each of the sub-TUs including at least one non-zero coefficient, and Table 5 indicates that the codeword corresponds to each of the sub-TUs being split into further sub-TUs. Accordingly, in this case, entropy decoding unit 70 may determine that, for sub-TUs of a TU of a CU having a decoding context corresponding to Table 4 or Table 5, and for a codeword received for the sub-TUs having the value "1," that a component of each of the sub-TUs includes at least one non-zero coefficient, i.e., is coded, in the case of Table 4, or that each of the sub-TUs is split into further sub-TUs, in the case of Table 5.

Video decoder 30 may decode the CU using the one or more CBFs and the TSF for the TU, and/or the CBFs or the TSFs for the sub-TUs, determined using the one or more codewords. As an example, inverse transform unit 78 and/or inverse quantization unit 76 may use the determined CBFs to determine which TUs of the one or more TUs of the CU contain components that include at least one non-zero coefficient, and use the determined TSFs to generate partition information for the one or more TUs, in order to perform inverse transform and inverse quantization. Once again, because using the VLC coding techniques described above may, in the average case, result in the one or more codewords comprising fewer bits than individually coded CBFs and TSFs represented by the codewords, there may be a relative bit savings for a coded bitstream including the codewords when using the techniques of this disclosure.

Motion compensation unit 72 may use motion vectors received in the bitstream to identify a prediction block in reference frames in reference frame store 82. Intra prediction unit 74 may use intra prediction modes received in the bitstream to form a prediction block from spatially adjacent blocks.

Intra-prediction unit 74 may use an indication of an intra-prediction mode for the encoded block to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction unit 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by HM. The inverse quantization process may also include use of a quantization parameter $QP_Y$ calculated by encoder 50 for each block to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. As described above, according to the techniques of this disclosure, syntax information that describes how transform coefficients of one or more TUs of a CU are partitioned may be jointly coded for the one or more TUs, in some cases along with other syntax information, and used by inverse transform unit 58 as described herein.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information for the encoded block to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In this manner, video decoder 30 of FIG. 3 represents an example of an apparatus for decoding video data, including a video decoder configured to determine whether a component of a TU of a CU of video data includes at least one non-zero coefficient based on a codeword for the TU, determine whether the TU is split into sub-TUs based on the codeword, and decode the TU based on the determinations.

Figure 4:
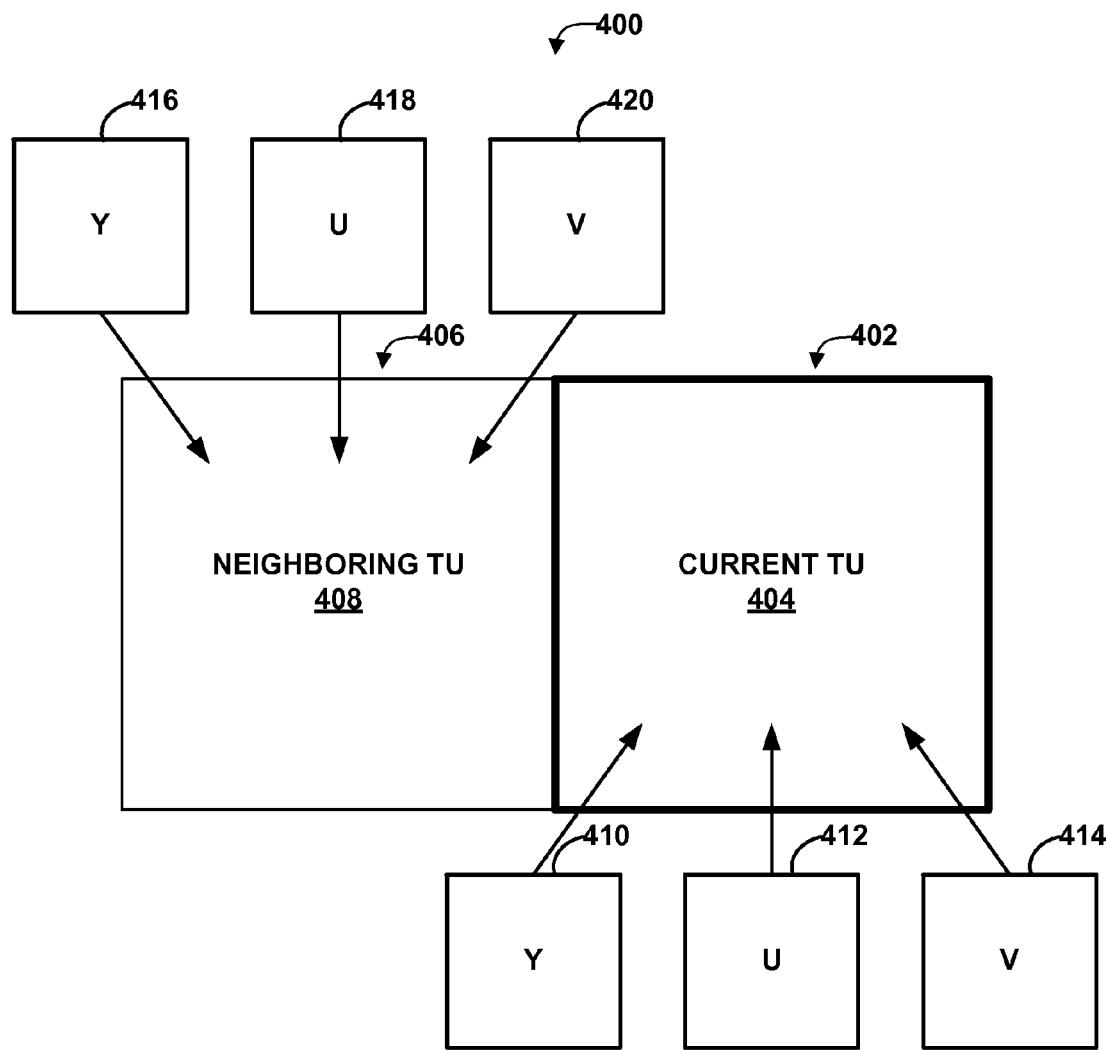
FIG. 4 is a conceptual diagram that illustrates examples of TUs of CUs of video data.

FIG. 4 is a conceptual diagram that illustrates examples of TUs of CUs of video data. As depicted in FIG. 4, current CU 402 of video frame 400 may represent a currently-coded CU. For example, current CU 402 may represent a sub-CU of an LCU of video frame 400, corresponding to a leaf-node in a CU quadtree associated with the LCU, as previously described. Current CU 402 may have any size, e.g., 8×8, 16×16, 32×32, or 64×64 pixels. As depicted in FIG. 4, current CU 402 may include current TU 404, which, in turn, may include each of Y component 410, U component 412, and V component 414. For example, Y component 410 may correspond to a luminance component of current TU 404, and U component 412 and V component 414 may correspond to a first chrominance component and a second chrominance component of current TU 404, respectively.

In this example, as illustrated in FIG. 4, a size of current TU 404 may correspond to the size of current CU 402. Furthermore, a size of each of Y component 410, U component 412, and V component 414 may correspond to the size of current TU 404. In other words, the size of each of Y component 410, U component 412, and V component 414 may correspond to the size of current CU 402. According to other examples, current TU 404 and associated Y component 410, U component 412, and V component 414, may be partitioned into sub-TUs and respective Y, U, and V sub-components. For example, current TU 404 may be partitioned into four sub-TUs, wherein each sub-TU may include respective Y, U, and V components that correspond to sub-components of Y component 410, U component 412, and V component 414 of current TU 404.

FIG. 4 also illustrates neighboring CU 406 of current CU 402 of video frame 400. As shown in FIG. 4, neighboring CU 406 is positioned to the left of current CU 402 in video frame 400. In other examples, neighboring CU 406, or any other neighboring CU of current CU 402, may be positioned above current CU 402 in video frame 400. In still other examples, neighboring CUs of current CU 402 may be positioned at other locations neighboring current CU 402. As also shown in FIG. 4, neighboring CU 406 may include neighboring TU 408, which may include Y component 416, U component 418, and V component 420, wherein neighboring TU 408 and associated Y component 416, U component 418, and V component 420 may be partitioned into sub-TUs and respective Y, U, and V sub-components in a substantially similar manner as described above with reference to current TU 404.

For each TU of current CU 402, including current TU 404, and for each TU of neighboring CU 406, including neighboring TU 408, syntax information describing whether one or more components, e.g., one or more of Y, U, or V components, of the respective TU includes at least one non-zero coefficient, i.e., is coded, and whether the TU is split into sub-TUs, may be provided. This syntax information may generally correspond to one or more CBFs and a TSF for the TU, as described above. For example, the one or more CBFs and the TSF for the TU may each be represented using a single-bit value, e.g., a single-bit flag. In some examples, in the case of a given one of the CBFs, video encoder 20 may set the corresponding single-bit flag to a value of "1" to indicate that a component of the TU corresponding to the CBF includes at least one non-zero coefficient, and set the flag to a value of "0" to indicate that the component does not include any non-zero coefficients. Similarly, in the case of the TSF, video encoder 20 may set the corresponding single-bit flag to a value of "1" to indicate that the TU is split into the sub-TUs, and set the flag to a value of "0" to indicate that the TU is not split.

According to the techniques of this disclosure, as one example, video encoder 20 may jointly encode one or more CBFs and a TSF for a TU of a CU of video data, e.g., current TU 404, neighboring TU 408, or any sub-TU of current TU 404 or neighboring TU 408. For example, when jointly encoding one or more CBFs and a TSF for current TU 404, video encoder 20 may jointly encode one or more CBFs corresponding to one or more of Y component 410, U component 412, and V component 414, along with a TSF for current TU 404. As previously described, video encoder 20 may jointly encode the one or more CBFs and the TSF using a single VLC codeword. As such, video decoder 30 may receive the single VLC codeword, and decode the codeword to determine the one or more CBFs and the TSF for current TU 404.

As also previously described, video encoder 20 may jointly encode a CBF corresponding to Y component 410, i.e., $CBF_Y$, and a CBF corresponding to both U component 412 and V component 414, i.e., $CBF_C$, for current TU 404, along with a TSF for current TU 404, also using a single VLC codeword, e.g., a first codeword. Additionally, in some cases, video encoder 20 may further jointly encode CBFs corresponding to U component 412 and V component 414, i.e., $CBF_U$ and $CBF_V$, using another single VLC codeword, e.g., a second codeword. Once again, video decoder 30 may receive the one or more single VLC codewords, and decode the codewords to determine the one or more CBFs and the TSF for current TU 404.

In these examples, to jointly encode the one or more CBFs and the TSF using the one or more single VLC codewords, video encoder 20 may select a VLC table that includes the respective codeword based on an encoding context for current TU 404. For example, when jointly encoding the one or more CBFs and the TSF, including the $CBF_Y$, $CBF_C$, and TSF, for current TU 404, the encoding context may include one or more of the following: a prediction mode for a PU corresponding to current TU 404, a partition level for current TU 404, and a number of components of current TU 404 to be represented by the single VLC codeword. Additionally, when jointly encoding the $CBF_U$ and $CBF_V$ for current TU 404, the encoding context may include one or more of the following: a partition level for current CU 402, a partition level for current TU 404, and CBF values corresponding to first chrominance components and second chrominance components of neighboring TUs of current TU 404. In this example, the neighboring TUs may be other TUs of current CU 402 for which luminance CBFs, chrominance CBFs, and TSFs were previously jointly encoded in the same manner as described herein. Video encoder 20 may then select the respective single VLC codeword from the VLC table, such that the VLC table provides an indication that the codeword corresponds to the one or more CBFs and the TSF, or to the chrominance CBFs, for current TU 404, and provide the codeword for current TU 404.

Similarly, to decode the one or more single VLC codewords to determine the one or more CBFs and the TSF, or the chrominance CBFs, for current TU 404, video decoder 30 may also select a VLC table that includes the respective codeword based on a decoding context for current TU 404, wherein the decoding context may be substantially the same as the encoding context. As such, the VLC tables selected by video encoder 20 and video decoder 30 may be substantially the same. Video decoder 30 may then determine the one or more CBFs and the TSF for current TU 404 based on the one or more single VLC codewords, and decode current TU 404 based on the determinations.

As another example, video encoder 20 may jointly encode CBFs or TSFs for sub-TUs of a TU of a CU, once again, e.g., current TU 404, neighboring TU 408, or any sub-TU of current TU 404 or neighboring TU 408. For example, when jointly encoding CBFs for sub-TUs of current TU 404, video encoder 20 may jointly encode CBFs corresponding to respective Y components of the sub-TUs that, in turn, correspond to sub-components of Y component 410 of current TU 404. For example, video encoder 20 may jointly encode the CBFs for the sub-TUs when only the respective CBFs for the Y components of the sub-TUs are coded, i.e., the other CBFs and the TSFs for the sub-TUs are inferred. Similarly, when jointly encoding TSFs for the sub-TUs of current TU 404, video encoder 20 may jointly encode the TSFs for the sub-TUs when none of the CBFs for the sub-TUs are coded, i.e., all of the CBFs for the sub-TUs are inferred.

As also previously described, video encoder 20 may jointly encode the CBFs or TSFs for the sub-TUs using a single VLC codeword. As such, video decoder 30 may receive the single VLC codeword, and decode the codeword to determine the CBFs or TSFs for the sub-TUs.

In this example, to jointly encode the CBFs or TSFs using the single VLC codeword, video encoder 20 may once again select a VLC table that includes the codeword based on an encoding context for the sub-TUs. For example, when jointly encoding the CBFs for the sub-TUs, the encoding context may include values of the TSFs for the sub-TUs. Similarly, when jointly encoding the TSFs for the sub-TUs, the encoding context may include values of the CBFs for the sub-TUs, e.g., CBFs for the Y components of the sub-TUs. Video encoder 20 may then select the single VLC codeword from the VLC table, such that the VLC table provides an indication that the codeword corresponds to the CBFs or TSFs for the sub-TUs, and provide the codeword for the sub-TUs.

Similarly, to decode the single VLC codeword to determine the CBFs or TSFs for the sub-TUs, video decoder 30 may also select a VLC table based on a decoding context for the sub-TUs, wherein the decoding context may be substantially the same as the encoding context. As such, the VLC tables selected by video encoder 20 and video decoder 30 may once again be substantially the same. Video decoder 30 may then determine the CBFs or TSFs for the sub-TUs based on the single VLC codeword, and decode the sub-TUs based on the determinations.

In this manner, according to the techniques of this disclosure, video encoder 20 and/or video decoder 30 may jointly code one or more CBFs and a TSF for a TU of a CU of video data. Additionally, video encoder 20 and/or video decoder 30 may jointly code CBFs or TSFs for sub-TUs of a TU of a CU of video data. As described above, these techniques may enable coding CBF and TSF syntax elements for a TU of a CU of video data relatively more efficiently than when individually coding the syntax elements for the TU.

Figure 5A:
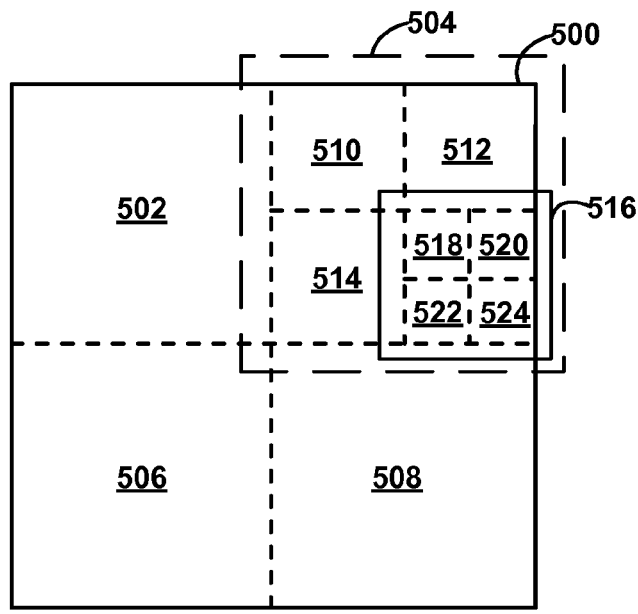
FIG. 5A is a conceptual diagram that illustrates an example of a TU of a CU of video data.

FIG. 5A is a conceptual diagram that illustrates an example of a TU of a CU of video data. As shown in FIG. 5A, TU 500, which may represent a largest TU of a leaf-node CU, may be split into sub-TUs 502, 504, 506, and 508. Assume, for this example, that TU 500 has a size of 2N×2N pixels. Accordingly, each of sub-TUs 502, 504, 506, and 508 may have a size of N×N pixels. Similarly, sub-TU 504 may be split into sub-TUs 510, 512, 514, and 516, wherein each of sub-TUs 510, 512, 514, and 516 may have a size of N/2×N/2 pixels. Sub-TUs 510, 512, 514, and 516 are also considered sub-TUs of TU 500. Likewise, sub-TU 516 may be split into sub-TUs 518, 520, 522, and 524, wherein each of sub-TUs 518, 520, 522, and 524 may have a size of N/4×N/4 pixels, and so forth. Accordingly, in this example, TU 500 may be split into sub-TUs, wherein some of the sub-TUs may be split into further sub-TUs. In other words, TU 500 may be split into sub-TUs in a recursive manner.

In a similar manner as described above with reference to a partition level of a CU, each TU of a CU, including a largest TU of the CU and sub-TUs of the largest TU, may be associated with a particular partition level (or "depth"), starting with level 0 corresponding to the root-node TU of the CU, also referred to as the "largest" TU for the CU. In the example of FIG. 5A, TU 500 may correspond to a largest TU of a CU, and may be associated with a partition level 0. Similarly, sub-TUs 502, 504, 506, and 508 of TU 500 may be associated with a partition level 1, sub-TUs 510, 512, 514, and 516 of sub-TU 504 may be associated with a partition level 2, and sub-TUs 518, 520, 522, and 524 of sub-TU 516 may be associated with a partition level 3. Accordingly, one more TUs of a CU of video data may share a partition level. Furthermore, as described in greater detail below, information indicating a partition level for one or more TUs of a CU, as well as other syntax information, may be represented using a data structure, such as an RQT, or a uniform partition structure.

Figure 5B:
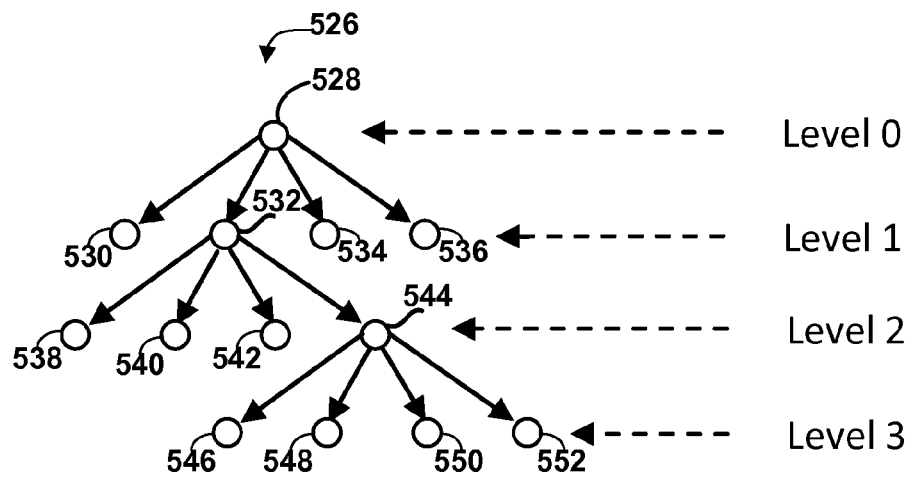
FIG. 5B is a conceptual diagram that illustrates an example of a residual quadtree transform data structure that represents partition information for the TU of FIG. 5A.

FIG. 5B is a conceptual diagram that illustrates an example of an RQT that represents partition information for TU 500 of FIG. 5A. As shown in FIG. 5B, RQT 526 includes a root node 528, which corresponds to TU 500, and is associated with a partition level 0. As also shown in FIG. 5B, RQT 526 includes terminal, or "leaf" nodes 530, 534, 536, 538, 540, 542, 546, 548, 550, and 552, with no child nodes, and intermediate nodes 532 and 544, each having four child nodes. In this example, root node 528 has four child nodes, including three leaf nodes 530, 534, and 536, and one intermediate node 532. In this example, nodes 530, 532, 534, and 536 correspond to sub-TUs 502, 504, 506, and 508 of TU 500, respectively, and are each associated with a partition level 1.

Because node 532 is not a leaf node, node 532 includes four child nodes, including three leaf nodes 538, 540, and 542, and one intermediate node 544. In this example, nodes 538, 540, 542, and 544 correspond to sub-TUs 510, 512, 514, and 516 of TU 500, respectively, and are each associated with a partition level 2. Intermediate node 544 includes four leaf nodes 546, 548, 550, and 552, which correspond to sub-TUs 518, 520, 522, and 524 of TU 500, respectively, and are each associated with a partition level 3. In general, an RQT for a TU of a CU of video data may include more or fewer nodes and associated partition levels than the example of RQT 526.

Figure 5C:
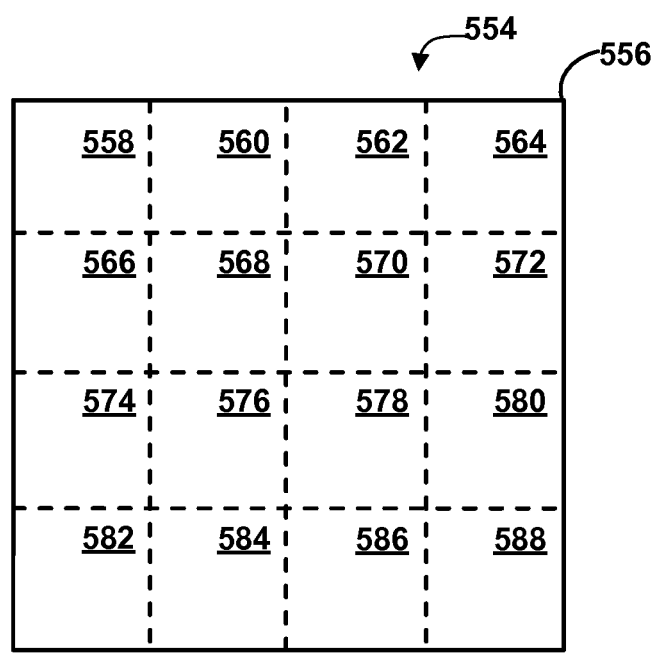
FIG. 5C is a conceptual diagram that illustrates an example of a uniform partition structure for a TU of a CU of video data.

FIG. 5C is a conceptual diagram that illustrates an example of a uniform partition structure for a TU of a CU of video data. For example, TU 556 may represent a largest TU of a leaf-node CU. In other examples, TU 556 may represent a sub-TU of the largest TU of the CU, where the largest TU is partitioned according to an RQT, as previously described. In this manner, according to the techniques of this disclosure, uniform partition structure 554 may be used as a sole partition structure for a largest TU of a CU, or in conjunction with an RQT, as shown in FIG. 5B, associated with the largest TU. As one example, the largest TU may be split into sub-TUs based on uniform partition structure 554. As another example, the largest TU may be split into sub-TUs based on the RQT, and one or more of the sub-TUs may be split into further sub-TUs based on uniform partition structure 554. In any case, sub-TUs 558-588 may correspond to sub-TUs of TU 556 partitioned according to uniform partition structure 554.

In accordance with the techniques of this disclosure, a uniform partition structure associated with a TU (e.g., a largest TU of a CU, or a sub-TU of the largest TU) may be signaled in the bitstream using syntax information indicating that the uniform partition structure is used for the TU, and a number of sub-TUs into which the TU is split according to the uniform partition structure (e.g., 4, 16, 64, and so forth). For example, the number of the sub-TUs into which the TU is split according to the uniform partition structure may indicate a size of each of the sub-TUs. Furthermore, in some examples, the number of the sub-TUs into which the TU is split according to the uniform partition structure may correspond to a partition level for the sub-TUs, in a similar manner as described above with reference to an RTQ. In general, a uniform partition structure for a given TU of a CU of video data may include more or fewer partitions than the example of uniform partition structure 554.

Referring again to FIGS. 5A and 5B, each node of RQT 526 may include one or more CBFs and a TSF for the corresponding TU. For example, as previously described, the one or more CBFs and the TSF for the TU may each be represented using a single-bit value, e.g., a single-bit flag. As described above, in some examples, in the case of a given one of the CBFs, video encoder 20 may set the corresponding single-bit flag to a value of "1" to indicate that a component of the TU corresponding to the CBF includes at least one non-zero coefficient, i.e., is coded, and set the flag to a value of "0" to indicate that the component does not include any non-zero coefficients, i.e., is not coded. Similarly, in the case of the TSF, video encoder 20 may set the corresponding single-bit flag to a value of "1" to indicate that the TU is split into sub-TUs, and set the flag to a value of "0" to indicate that the TU is not split.

According to the techniques of this disclosure, as one example, video encoder 20 may jointly encode one or more CBFs and a TSF for a TU of a CU, e.g., TU 500, or sub-TUs of TU 500. As previously described, video encoder 20 may jointly encode the one or more CBFs and the TSF using a single VLC codeword, and video decoder 30 may receive the single VLC codeword, and decode the codeword to determine the one or more CBFs and the TSF for the TU.

As another example, as also previously described, video encoder 20 may jointly encode a CBF that corresponds to both chrominance components, i.e., $CBF_C$, of a TU of a CU, e.g., TU 500, or sub-TUs of TU 500, along with a CBF that corresponds to a luminance component of the TU, and a TSF for the TU, also using a single VLC codeword. Additionally, as also previously described, in some cases, video encoder 20 may further jointly encode CBFs that correspond to the chrominance components of the TU using another single VLC codeword. Once again, video decoder 30 may receive the one or more single VLC codewords, and decode the codewords to determine the one or more CBFs and the TSF for the TU.

As still another example, as also previously described, video encoder 20 may jointly encode CBFs or TSFs for sub-TUs of a TU of a CU, e.g., sub-TUs 510, 512, 514, and 516, of TU 500. As also previously described, video encoder 20 may jointly encode the CBFs or TSFs also using a single VLC codeword, and video decoder 30 may receive the single VLC codeword, and decode the codeword to determine the CBFs or TSFs for the sub-TUs.

In cases where video encoder 20 and/or video decoder 30 jointly code one or more CBFs and a TSF for a TU, e.g., TU 500, or a sub-TU of TU 500, a node of RQT 526 that corresponds to the TU may include one or more single values (e.g., one or more single VLC codewords) that represent the one or more CBFs and the TSF for the TU. In other words, the one or more single values that represent the one or more CBFs and the TSF may be included in the same node or partition as the original one or more CBFs and TSF.

In cases where video encoder 20 and/or video decoder 30 jointly code CBFs or TSFs for sub-TUs of a TU, e.g., TU 500, or a sub-TU of TU 500, a node of RQT 526 that corresponds to the TU may include a single value (e.g., a single VLC codeword) that represents the CBFs or TSFs for the sub-TUs. In this manner, the single value that represents the CBFs or TSFs for the sub-TUs may be included in a node corresponding to a parent TU of the sub-TUs. For example, with respect to TU 500, video encoder 20 and/or video decoder 30 may jointly code CBFs or TSFs for sub-TUs 502, 504, 506, and 508 of TU 500, corresponding to nodes 530, 532, 534, and 536 of RQT 526, respectively. The resulting single value that represents the CBFs or TSFs may be included in root node 528 of RQT 526, which is the parent node to nodes 530, 532, 534, and 536.

In this manner, according to the techniques of this disclosure, video encoder 20 and/or video decoder 30 may jointly code one or more CBFs and a TSF for a TU of a CU of video data. Additionally, video encoder 20 and/or video decoder 30 may jointly code CBFs or TSFs for sub-TUs of a TU of a CU of video data. As described above, these techniques may enable coding CBF and TSF syntax elements for a TU of a CU of video data relatively more efficiently than when individually coding the syntax elements for the TU.

Figure 6:
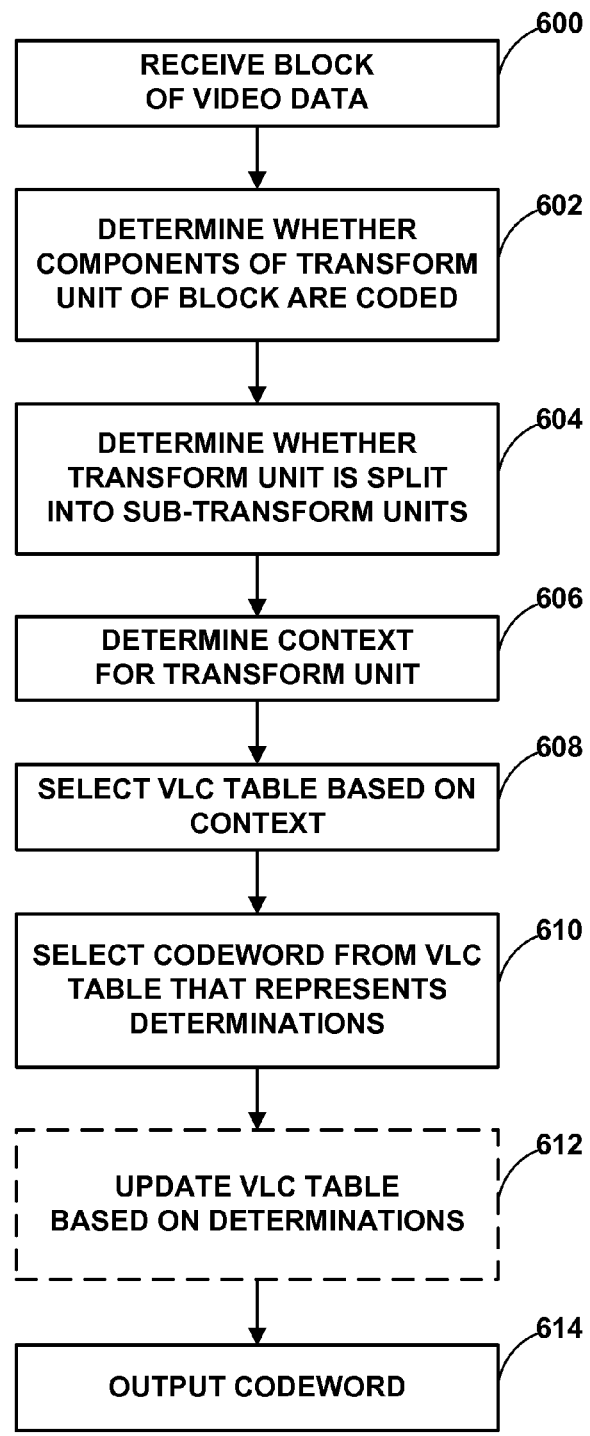
FIG. 6 is a flowchart that illustrates an example method for jointly encoding one or more CBFs and a TSF for a TU of a CU of video data.

FIG. 6 is a flowchart that illustrates an example method for jointly encoding one or more CBFs and a TSF for a TU of a CU of video data. The techniques of FIG. 6 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 6 are described with respect to video encoder 20 (FIGS. 1 and 2), although it should be understood that other devices may be configured to perform similar techniques. Moreover, the steps illustrated in FIG. 6 may be performed in a different order or in parallel, and additional steps may be added and certain steps omitted, without departing from the techniques of this disclosure.

Initially, video encoder 20 may receive a block of video data (600). The block may correspond to a CU, such as a sub-CU of an LCU, corresponding to a leaf-node in a CU quadtree associated with the LCU, as described above. The CU may include one or more TUs, e.g., including a largest TU of the CU, which may be split into sub-TUs according to an RQT associated with the largest TU, as also described above. In this manner, the method of FIG. 6 may be applied recursively to any TU of the CU, including the largest TU of the CU, and sub-TUs of the largest TU.

Video encoder 20 may further determine whether one or more components of a given TU of the block, or CU, are coded, i.e., include at least one non-zero coefficient (602). For example, entropy encoding unit 56 may make this determination as part of generating syntax information used to encode the CU, as described above, where the results of the determination may correspond to one or more CBFs for the one or more components of the TU. Video encoder 20 may further determine whether the TU is split into sub-TUs (604). For example, this determination may be made earlier in the process of encoding the CU, as part of generating prediction data for the CU, e.g., by mode select unit 40, in conjunction with transform unit 52, and/or other units or components of video encoder 20, as also described above. The results of this determination may correspond to a TSF for the TU.

Assuming, for purposes of example, that video encoder 20 determines whether the one or more components of the TU are coded, and whether the TU is split into the sub-TUs, video encoder 20 may further determine values for the corresponding one or more CBFs and TSF. For example, a CBF value of "1" may indicate that the corresponding component is coded, and a CBF value of "0" may indicate that the component is not coded. Similarly, a TSF value of "1" may indicate that the TU is split into the sub-TUs, and a TSF value of "0" may indicate that the TU is not split.

Video encoder 20 may further encode the one or more CBFs and the TSF for the TU. For example, mode select unit 40 and/or transform unit 52 may provide the value for the TSF to entropy encoding unit 56. As described above, entropy encoding unit 56 may determine the values for the one or more CBFs as part of generating the syntax information used to encode the CU.

To encode the one or more CBFs and the TSF for the TU, entropy encoding unit 56, or another unit of video encoder 20, may determine a context for the TU (606). The context for the TU may include, e.g., one or more of the following: a prediction mode for a PU corresponding to the TU, a partition level for the TU, and a number of components of the TU to be represented by the codeword.

As one example, entropy encoding unit 56 may receive information indicating the prediction mode for the PU corresponding to the TU from mode select unit 40. The information may be generated as part of generating prediction data for the CU. As another example, entropy encoding unit 56 may determine the partition level for the TU from other previously encoded TUs (e.g., a parent TU of the TU in the corresponding RQT) of the CU. As still another example, entropy encoding unit 56 may determine the number of components of the TU to be represented by the codeword by determining whether values of any CBFs for the TU may be inferred using other previously encoded TUs (e.g., parent and sibling TUs of the TU in the corresponding RQT) of the CU.

Entropy encoding unit 56 may further select a VLC table based on the context (608). For example, the VLC table may include a mapping of codewords to CBF and TSF values. Entropy encoding unit 56 may further select a codeword from the VLC table that represents the above determinations (610). That is, entropy encoding unit 56 may select a codeword representative of whether the one or more components of the TU of the block are coded, as well as whether the TU is split into the sub-TUs. For example, as described above, entropy encoding unit 56 may select a shortest (e.g., single-bit) codeword when the CBF and the TSF values are the most likely values for the TU for the context. On the other hand, entropy encoding unit 56 may select a codeword other than the shortest codeword when the CBF and the TSF values are not the most likely values. For example, the codeword may have a length, e.g., a bit length, that is inversely proportional to the likelihood of the CBF and the TSF values, i.e., likelihood of the one or more components of the TU being coded, and the TU being split into the sub-TUs, for the TU for the context.

In some examples, entropy encoding unit 56 may further update the VLC table based on the above determinations to reflect which determinations are more or less likely to occur (612). For example, entropy encoding unit 56 may update the mapping of the codewords to the CBF and TSF values within the VLC table based on the determined CBF and TSF values, such that values that occur more frequently for the context are mapped to shorter VLC codewords than other, less frequently-occurring values, as previously described.

Finally, entropy encoding unit 56 may output the codeword to the bitstream (614). For example, entropy encoding unit 56 may include the codeword in a node of an RQT corresponding to the TU, such that the codeword comprises a single value that represents the one or more CBFs and the TSF for the TU.

In this manner, the method of FIG. 6 represents an example of a method of encoding video data, including determining whether a component of a TU of a CU of video data includes at least one non-zero coefficient, determining whether the TU is split into sub-TUs, selecting a codeword from a VLC table, wherein the VLC table provides an indication that the codeword corresponds to the determinations, and providing the codeword for the TU.

Figure 7:
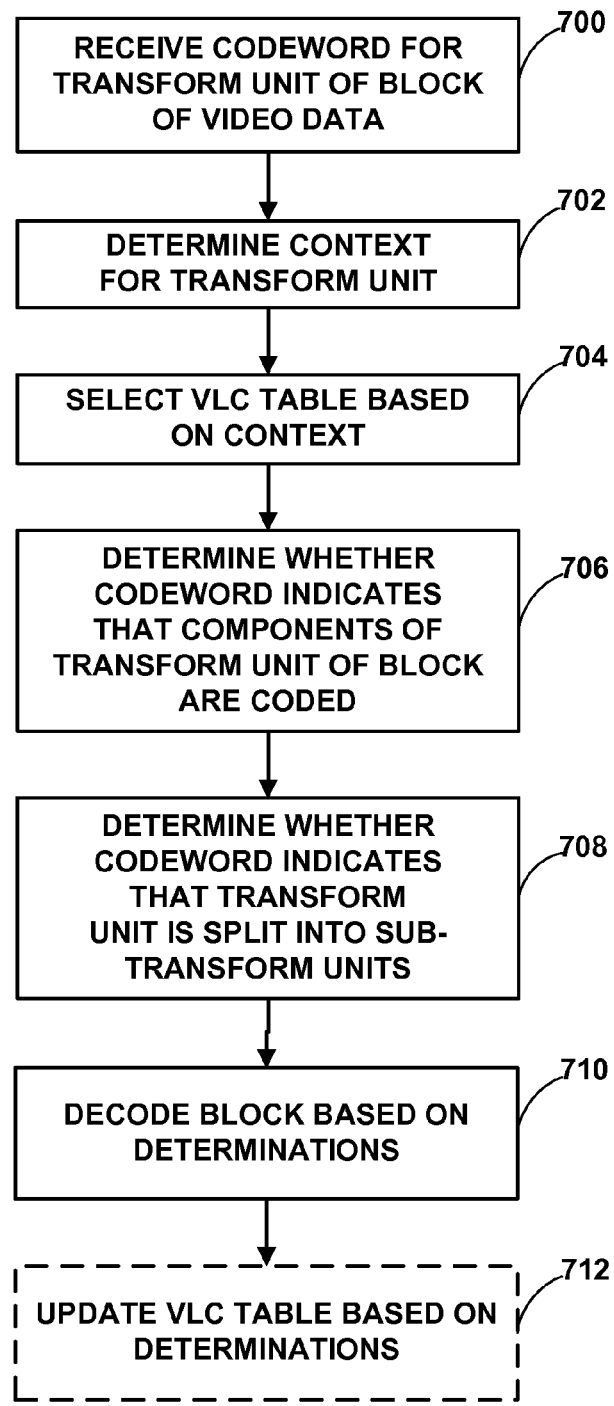
FIG. 7 is a flowchart that illustrates an example method for decoding jointly encoded one or more CBFs and a TSF for a TU of a CU of video data.

FIG. 7 is a flowchart that illustrates an example method for decoding jointly encoded one or more CBFs and a TSF for a TU of a CU of video data. Once again, the techniques of FIG.

7 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 7 are described with respect to video decoder 30 (FIGS. 1 and 3), although it should be understood that other devices may be configured to perform similar techniques. Moreover, the steps illustrated in FIG. 7 may be performed in a different order or in parallel, and additional steps may be added and certain steps omitted, without departing from the techniques of this disclosure.

Initially, video decoder 30 may receive a codeword for a TU of a block of video data (700). Video decoder 30 may also receive video data for the block, e.g., quantized transform coefficients and/or block header data, indicating a prediction mode for the block and other syntax information. As described above with reference to the example method of FIG. 6, the block may correspond to a CU, such as a sub-CU of an LCU, corresponding to a leaf-node in a CU quadtree associated with the LCU. The CU may include one or more TUs, e.g., including a largest TU of the CU, which may be split into sub-TUs according to an RQT associated with the largest TU, as also described above. In this manner, the method of FIG. 7 may be applied recursively to any TU of the CU, including the largest TU of the CU and sub-TUs of the largest TU. As also described above, the codeword may comprise a VLC codeword.

Video decoder 30 may further determine a context for the TU (702). For example, entropy decoding unit 70 may determine the context for the TU in a substantially similar manner as described above with reference to entropy encoding unit 56, based on e.g., one or more of the following: a prediction mode for a PU corresponding to the TU, a partition level for the TU, and a number of components of the TU represented by the codeword.

As one example, entropy decoding unit 70 may determine the prediction mode for the PU corresponding to the TU from received syntax information contained within the header data for the CU. As another example, entropy decoding unit 70 may determine the partition level for the TU from previously received codewords for other TUs (e.g., a parent TU of the TU in the corresponding RQT) of the CU. As still another example, entropy decoding unit 70 may determine the number of components of the TU represented by the codeword by determining whether values of any CBFs for the TU may be inferred using previously received codewords for other TUs (e.g., parent and sibling TUs of the TU in the corresponding RQT) of the CU.

Entropy decoding unit 70 may further select a VLC table based on the context (704). For example, the VLC table may include a mapping of codewords to CBF and TSF values. Entropy decoding unit 70 may then determine whether one or more components of the TU are coded, i.e., include at least one non-zero coefficient, based on the codeword and the VLC table. Furthermore, entropy decoding unit 70 may determine whether the TU is split into sub-TUs based on the codeword and the VLC table. For example, entropy decoding unit 70 may retrieve values for CBF and TSF syntax elements corresponding to the above determinations that are mapped to the received codeword within the VLC table. In this manner, entropy decoding unit 70 may determine whether the codeword indicates that the one or more components of the TU of the block are coded (706), as well as whether the codeword indicates that the TU is split into the sub-TUs (708).

VLC tables of video decoder 30 may be substantially similar to VLC tables of video encoder 20. As previously described, entropy decoding unit 70 may determine the context for the TU in a substantially similar manner as described above with reference to entropy encoding unit 56. As such, video decoder 30 selecting the VLC table using the context may result in the VLC table including a substantially similar mapping of VLC codewords to CBF and TSF values as that of a VLC table used by video encoder 20 to select the codeword. This similarity among the mappings may enable video decoder 30 to make the above determinations using the codeword and the VLC table.

As described above, the results of the above determinations may correspond to the one or more CBFs and the TSF for the TU. For example, a CBF value of "1" may indicate that a corresponding component of the TU is coded, and a CBF value of "0" may indicate that the component is not coded. Similarly, a TSF value of "1" may indicate that the TU is split into the sub-TUs, and a TSF value of "0" may indicate that the TU is not split. As also described above, the codeword may have a length that is inversely proportional to the likelihood of the CBF and the TSF values, i.e., likelihood of the one or more components of the TU being coded, and the TU being split into the sub-TUs, for the TU for the context.

Finally, entropy decoding unit 70 may decode the block, or CU, based on the above determinations (710). Additionally, in some examples, entropy decoding unit 70 may update the VLC table based on the above determinations to reflect which determinations are more or less likely to occur (712). For example, entropy decoding unit 70 may update the mapping of the codewords to the CBF and TSF values within the VLC table based on the determined CBF and TSF values, such that values that occur more frequently for the context are mapped to shorter VLC codewords than other, less frequently-occurring values, as previously described. In this manner, video decoder 30 may coordinate the mapping within the VLC table with a mapping within a VLC table used by video encoder 20 to jointly encode the one or more CBFs and the TSF for the TU.

In this manner, the method of FIG. 7 represents an example of a method of decoding video data, including determining whether a component of a TU of a CU of video data includes at least one non-zero coefficient based on a codeword for the TU, determining whether the TU is split into sub-TUs based on the codeword, and decoding the TU based on the determinations.

Figure 8:
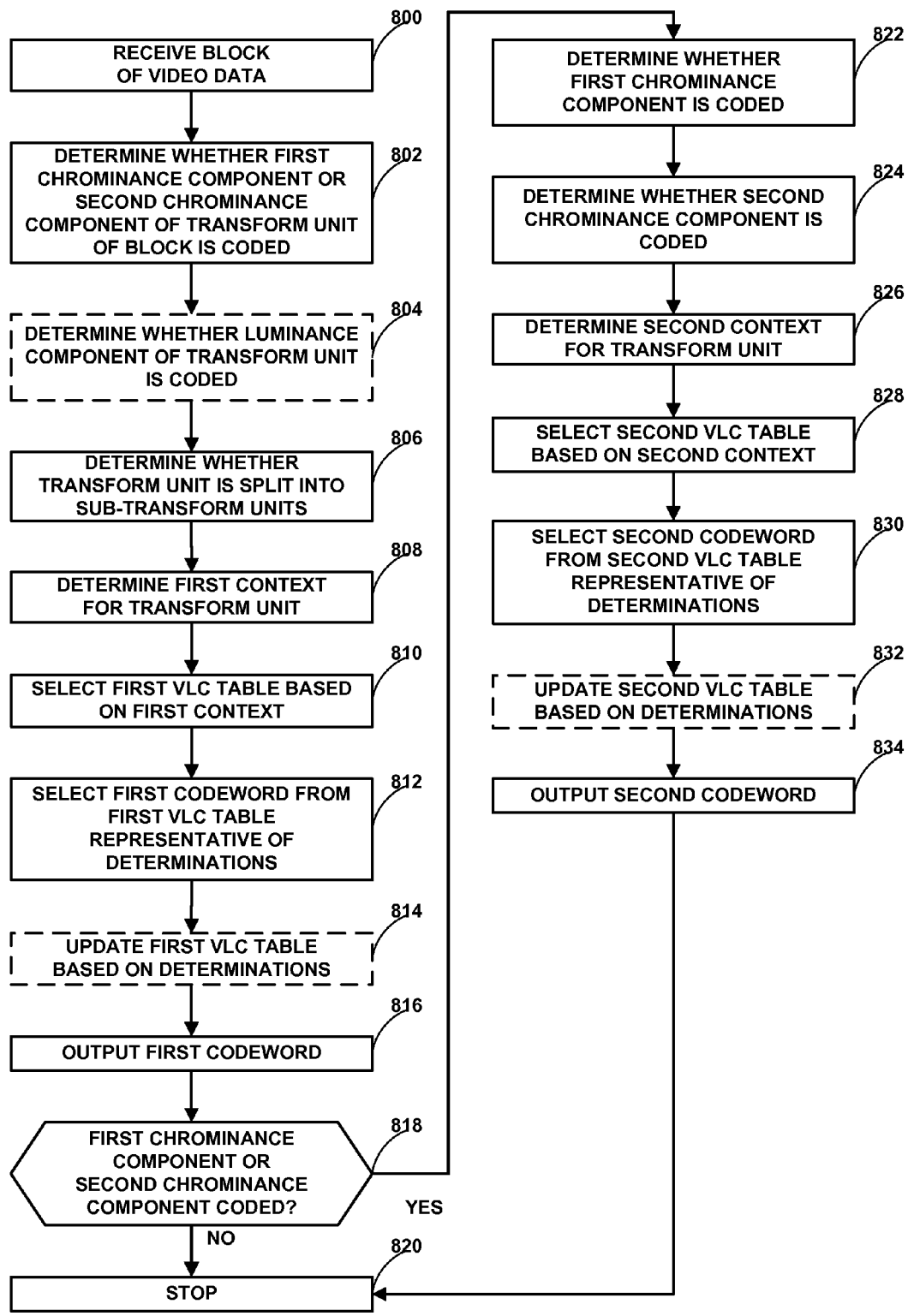
FIG. 8 is a flowchart that illustrates an example method for jointly encoding a luminance CBF, a chrominance CBF, and a TSF for a TU of a CU of video data.

FIG. 8 is a flowchart that illustrates an example method for jointly encoding a luminance CBF, a chrominance CBF, and a TSF for a TU of a CU of video data. Once again, the techniques of FIG. 8 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 8 are described with respect to video encoder 20 (FIGS. 1 and 2), although it should be understood that other devices may be configured to perform similar techniques. Moreover, the steps illustrated in FIG. 8 may be performed in a different order or in parallel, and additional steps may be added and certain steps omitted, without departing from the techniques of this disclosure.

Initially, video encoder 20 may receive a block of video data (800). As described above, the block may correspond to a CU, such as a sub-CU of an LCU, corresponding to a leaf-node in a CU quadtree associated with the LCU. As also described above, the CU may include one or more TUs, e.g., including a largest TU of the CU, which may be split into sub-TUs according to an RQT associated with the largest TU.

In this manner, the method of FIG. 8 may be applied recursively to any TU of the CU, including the largest TU of the CU, and sub-TUs of the largest TU.

Video encoder 20 may further determine whether a first chrominance component or a second chrominance component of a given TU of the block, or CU, is coded, i.e., includes at least one non-zero coefficient (802). For example, entropy encoding unit 56 may determine whether at least one of the first chrominance component and the second chrominance component of the TU is coded as part of generating syntax information used to encode the CU.

Entropy encoding unit 56 may make this determination by bitwise "OR"ing previously determined values of CBFs for the first chrominance component and the second chrominance component of the TU, e.g., corresponding to $CBF_U$ and $CBF_V$, where U and V refer to the first chrominance component and the second chrominance component, respectively. In other examples, entropy encoding unit 56 may make this determination using other techniques, e.g., by making the determination directly. In any case, the results of this determination may correspond to a chrominance CBF, e.g., $CBF_C$, for the TU, where $CBF_C$ may represent $CBF_U|CBF_V$, where '|' refers to the bitwise "OR" operator.

In some examples, video encoder 20 may further determine whether a luminance component of the TU is coded (804). In a similar manner as described above with reference to the first and second chrominance components of the TU, entropy encoding unit 56 may make this determination as part of generating the syntax information used to encode the CU. For example, the results of this determination may correspond to a luminance CBF, e.g., $CBF_Y$, for the TU, where Y refers to the luminance component.

Video encoder 20 may further determine whether the TU is split into sub-TUs (806). As described above, this determination may be made earlier in the process of encoding the CU, as part of generating prediction data for the CU, e.g., by mode select unit 40, in conjunction with transform unit 52, where the results of the determination may correspond to a TSF for the TU.

Once again, assuming for purposes of example that video encoder 20 determines whether the luminance component of the TU is coded, whether at least one of the first chrominance component and the second chrominance component of the TU is coded, and whether the TU is split into the sub-TUs, video encoder 20 may further determine values for the corresponding $CBF_Y$, $CBF_C$, and TSF. For example, a CBF value of "1" may indicate that the luminance component of the TU is coded, and a CBF value of "0" may indicate that the luminance component is not coded. Similarly, a $CBF_C$ value of "1" may indicate that at least one of the first chrominance component and the second chrominance component of the TU is coded, and a $CBF_C$ value of "0" may indicate that the first chrominance component and the second chrominance component are not coded. Furthermore, a TSF value of "1" may indicate that the TU is split into the sub-TUs, and a TSF value of "0" may indicate that the TU is not split.

Video encoder 20 may further jointly encode the $CBF_Y$, $CBF_C$, and TSF for the TU. As described above, for example, mode select unit 40 and/or transform unit 52 may provide the value for the TSF to entropy encoding unit 56, and entropy encoding unit 56 may determine the values for the $CBF_Y$ and the $CBF_C$ as part of generating the syntax information used to encode the CU.

To jointly encode the $CBF_Y$, $CBF_C$, and TSF for the TU, entropy encoding unit 56, or another unit of video encoder 20, may determine a first context for the TU (808). In a similar manner as described above with reference to FIGS. 6-7, the first context for the CU may include, e.g., one or more of the following: a prediction mode for a PU corresponding to the TU, a partition level for the TU, and a number of components of the TU to be represented by the codeword.

Once again, as one example, entropy encoding unit 56 may receive information indicating the prediction mode for the PU corresponding to the TU from mode select unit 40. The information may be generated as part of generating prediction data for the CU. As another example, entropy encoding unit 56 may determine the partition level for the TU from other previously encoded TUs (e.g., a parent TU of the TU in the corresponding RQT) of the CU. As still another example, entropy encoding unit 56 may determine the number of components of the TU to be represented by the codeword by determining whether values of any CBFs for the TU may be inferred using other previously encoded TUs (e.g., parent and sibling TUs of the TU in the corresponding RQT) of the CU.

Entropy encoding unit 56 may further select a first VLC table based on the first context (810). For example, the first VLC table may include a mapping of codewords to $CBF_Y$, $CBF_C$, and TSF values. Entropy encoding unit 56 may further select a first codeword from the first VLC table representative of the above determinations (812). For example, as discussed above, entropy encoding unit 56 may select a shortest (e.g., single-bit) codeword when the $CBF_Y$, $CBF_C$, and TSF values comprise the most likely values for the TU for the first context. On the other hand, entropy encoding unit 56 may select a codeword other than the shortest codeword when the $CBF_Y$, $CBF_C$, and TSF values are not the most likely values. For example, the selected codeword may have a length, e.g., a bit length, that is inversely proportional to the likelihood of the $CBF_Y$, $CBF_C$, and TSF values, i.e., likelihood that the luminance component of the TU is coded, that at least one of the first chrominance component and the second chrominance component of the TU is coded, and that the TU is split into the sub-TUs, once again, for the TU for the first context.

As also described above, in some examples, entropy encoding unit 56 may further update the first VLC table based on the above determinations to reflect which determinations are more or less likely to occur (814). For example, entropy encoding unit 56 may update the mapping of the codewords to the $CBF_Y$, $CBF_C$, and TSF values within the first VLC table based on the determined $CBF_Y$, $CBF_C$, and TSF values, such that values that occur more frequently within the first context are mapped to shorter codewords than other, less frequently-occurring values, as previously described.

Finally, entropy encoding unit 56 may output the first codeword to the bitstream (816). For example, entropy encoding unit 56 may include the first codeword in an RQT for the CU, such that the first codeword comprises a single value that represents the $CBF_Y$, $CBF_C$, and TSF for the TU.

As described above, video encoder 20 may determine whether the first chrominance component or the second chrominance component of the TU of the block is coded (818). In this manner, video encoder 20 may determine whether at least one of the first chrominance component and the second chrominance component of the TU of the block is coded, as previously described. In the event that both the first chrominance component and the second chrominance component are not coded, entropy encoding unit 56 may stop jointly encoding the luminance CBF, chrominance CBFs, and TSF for the TU (820), and proceed to other coding tasks, e.g., encoding of other syntax elements for the CU or a subsequent CU. In the event at least one of the first chrominance component and the second chrominance component is coded, however, video encoder 20 may continue the encoding process by indicating which of the first and second chrominance components is coded.

For example, entropy encoding unit 56 may determine whether the first chrominance component is coded (822). Entropy encoding unit 56 may further determine whether the second chrominance component is coded (824). As described above, entropy encoding unit 56 may make these determinations as part of generating the syntax information used to encode the CU, wherein the determinations may correspond to $CBF_U$ and $CBF_V$ for the TU, respectively. As also described above, in some examples, these determinations may be made previously in the encoding process for the purpose of determining the $CBF_C$ for the TU. In other examples, these determinations may be made at a different point in the encoding process, e.g., only when at least one of the first chrominance component and the second chrominance component is coded.

In a similar manner as described above, assuming for purposes of example that video encoder 20 determines whether the first chrominance component and the second chrominance component of the TU are coded, video encoder 20 may further determine values for the corresponding $CBF_U$ and $CBF_V$. Once again, for example, a CBF value of "1" may indicate that a corresponding chrominance component of the TU is coded, and a CBF value of "0" may indicate that the chrominance component is not coded.

Video encoder 20 may further provide an indication of whether the first chrominance component and the second chrominance component of the TU are coded. In some examples, video encoder 20 may provide this indication by explicitly signaling the $CBF_U$ and $CBF_V$ for the TU in the bitstream, wherein each CBF is signaled individually. In other examples, video encoder 20 may provide this indication by jointly encoding the $CBF_U$ and $CBF_V$ for the TU in a substantially similar manner as described above with reference to jointly encoding the $CBF_Y$, $CBF_C$, and TSF for the TU.

To jointly encode the $CBF_U$ and $CBF_V$ for the TU, entropy encoding unit 56, or another unit of video encoder 20, may determine a second context for the TU (826). For example, entropy encoding unit 56 may determine the second context for the TU based on e.g., one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which luminance CBFs, chrominance CBFs, and TSFs were previously jointly encoded in the same manner as described herein. As one example, entropy encoding unit 56 may determine the partition level for the CU as part of generating the syntax information used to encode the CU, e.g., corresponding to a CU quadtree associated with an LCU of the CU, as previously described.

Entropy encoding unit 56 may further select a second VLC table based on the second context (828). For example, the second VLC table may include a mapping of codewords to $CBF_U$ and $CBF_V$ values. In some examples, entropy coding unit 56 may use a same context for selecting both the first VLC table and the second VLC table, in which case the first and second contexts discussed above may comprise the same context.

Entropy encoding unit 56 may further select a second codeword from the second VLC table representative of the above determinations for the first chrominance component and the second chrominance component (830). For example, as discussed above, entropy encoding unit 56 may select a shortest (e.g., single-bit) codeword when the $CBF_U$ and $CBF_V$ values comprise the most likely values for the TU for the second context. On the other hand, entropy encoding unit 56 may select a codeword other than the shortest codeword when the $CBF_U$ and $CBF_V$ values are not the most likely values. Once again, for example, the second codeword may have a length, e.g., a bit length, that is inversely proportional to the likelihood of the $CBF_U$ and $CBF_V$ values, i.e., likelihood of the first chrominance component and the second chrominance component of the TU being coded, once again, for the TU for the second context.

As described above, in some examples, entropy encoding unit 56 may further update the second VLC table based on the above determinations to reflect which determinations are more or less likely to occur (832). For example, entropy encoding unit 56 may update the mapping of the codewords to the $CBF_U$ and $CBF_V$ values within the second VLC table based on the determined $CBF_U$ and $CBF_V$ values, such that values that occur more frequently within the second context are mapped to shorter codewords than other, less frequently-occurring values, as previously described.

Finally, entropy encoding unit 56 may output the second codeword to the bitstream (834). For example, entropy encoding unit 56 may include the second codeword in the RQT for the CU along with the first codeword, such that the second codeword comprises a single value that represents the $CBF_U$ and $CBF_V$ for the TU. Entropy encoding unit 56 may then stop jointly encoding the luminance CBF, chrominance CBF, and TSF for the TU (820), and proceed to other coding tasks, e.g., encoding of other syntax elements for the CU or a subsequent CU.

In this manner, the method of FIG. 8 represents an example of a method of encoding video data, including determining whether a component of a TU of a CU of video data includes at least one non-zero coefficient, determining whether the TU is split into sub-TUs, selecting a codeword from a VLC table, wherein the VLC table provides an indication that the codeword corresponds to the determinations, and providing the codeword for the TU.

Figure 9:
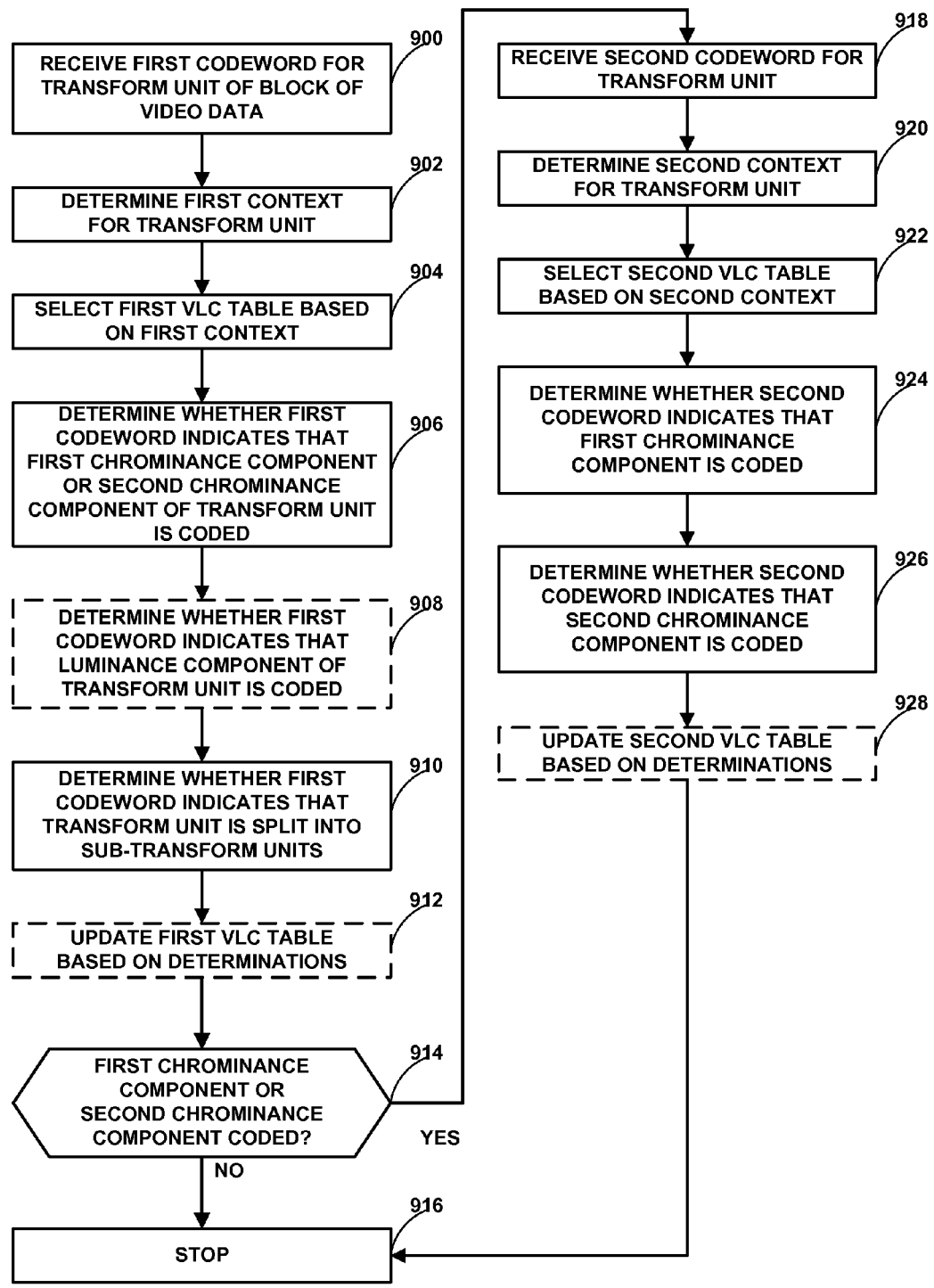
FIG. 9 is a flowchart that illustrates an example method for decoding jointly encoded luminance CBF, chrominance CBF, and TSF for a TU of a CU of video data.

FIG. 9 is a flowchart that illustrates an example method for decoding jointly encoded luminance CBF, a chrominance CBF, and TSF for a TU of a CU of video data. Once again, the techniques of FIG. 9 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 9 are described with respect to video decoder 30 (FIGS. 1 and 3), although it should be understood that other devices may be configured to perform similar techniques. Moreover, the steps illustrated in FIG. 9 may be performed in a different order or in parallel, and additional steps may be added and certain steps omitted, without departing from the techniques of this disclosure.

Initially, video decoder 30 may receive a first codeword for a TU of a block of video data (900). As described above, video decoder 30 may also receive video data for the block, e.g., quantized transform coefficients and/or block header data, indicating a prediction mode for the block and other syntax information. As also described above, the block may correspond to a CU, such as a sub-CU of an LCU, corresponding to a leaf-node in a CU quadtree associated with the LCU. The CU may include one or more TUs, e.g., including a largest TU of the CU, which may be split into sub-TUs according to an RQT associated with the largest TU, as also described above. In this manner, the method of FIG. 9 may be applied recursively to any TU of the CU, including the largest TU of the CU and sub-TUs of the largest TU. As also described above, the first codeword may comprise a VLC codeword.

Video decoder 30 may further determine a first context for the TU (902). For example, entropy decoding unit 70 may determine the first context for the TU in a substantially similar manner as described above with reference to entropy encoding unit 56 of FIG. 8, based on e.g., one or more of the following: a prediction mode for a PU corresponding to the TU, a partition level for the TU, and a number of components of the TU represented by the codeword.

As one example, entropy decoding unit 70 may determine the prediction mode for the PU corresponding to the TU from received syntax information contained within the header data for the CU. As another example, entropy decoding unit 70 may determine the partition level for the TU from previously received codewords for other TUs (e.g., a parent TU of the TU in the corresponding RQT) of the CU. As still another example, entropy decoding unit 70 may determine the number of components of the TU represented by the codeword by making inferences using previously received codewords for other TUs (e.g., parent and sibling TUs of the TU in the corresponding RQT) of the CU.

Entropy decoding unit 70 may further select a first VLC table based on the first context (904). For example, the first VLC table may include a mapping of codewords to $CBF_Y$, $CBF_C$, and TSF values. Entropy decoding unit 70 may further determine whether at least one of a first chrominance component and a second chrominance component of the TU is coded, i.e., includes at least one non-zero coefficient, based on the first codeword and the first VLC table. In some examples, entropy decoding unit 70 may further determine whether a luminance component of the TU is coded based on the first codeword and the first VLC table. Entropy decoding unit 70 may further determine whether the TU is split into sub-TUs based on the first codeword and the first VLC table. For example, entropy decoding unit 70 may retrieve values for $CBF_Y$, $CBF_C$, and TSF syntax elements corresponding to the above determinations that are mapped to the received first codeword within the first VLC table. In this manner, entropy decoding unit 70 may determine whether the first codeword indicates that the first chrominance component or the second chrominance component of the TU of the block is coded (906), whether the first codeword indicates that the luminance component of the TU is coded (908), and whether the first codeword indicates that the TU is split into the sub-TUs (910).

Once again, VLC tables of video decoder 30 may be substantially similar to VLC tables of video encoder 20. As previously described, entropy decoding unit 70 may determine the first context for the TU in a substantially similar manner as described above with reference to entropy encoding unit 56 of FIG. 8. As such, video decoder 30 selecting the first VLC table using the first context may result in the first VLC table including a substantially similar mapping of VLC codewords to $CBF_Y$, $CBF_C$, and TSF values as that of a VLC table used by video encoder 20 to select the first codeword. This similarity among the mappings may enable video decoder 30 to make the above determinations using the first codeword and the first VLC table.

As described above, the results of the above determinations may correspond to the $CBF_Y$, $CBF_C$, and TSF for the TU. For example, a CBF value of "1" may indicate that the luminance component of the TU is coded, and a CBF value of "0" may indicate that the luminance component is not coded. Similarly, a $CBF_C$ value of "1" may indicate that at least one of the first chrominance component and the second chrominance component of the TU is coded, and a $CBF_C$ value of "0" may indicate that the first chrominance component and the second chrominance component are not coded. Similarly, a TSF value of "1" may indicate that the TU is split into the sub-TUs, and a TSF value of "0" may indicate that the TU is not split. As also described above, the first codeword may have a length that is inversely proportional to the likelihood of the $CBF_Y$, $CBF_C$, and TSF values, i.e., likelihood that the luminance component of the TU is coded, that at least one of the first chrominance component and the second chrominance component of the TU is coded, and that the TU is split into the sub-TUs, for the TU for the first context.

As also described above, in some examples, entropy decoding unit 70 may update the first VLC table based on the above determinations to reflect which determinations are more or less likely to occur (912). For example, entropy decoding unit 70 may update the mapping of the codewords to the $CBF_Y$, $CBF_C$, and TSF values within the first VLC table based on the determined $CBF_Y$, $CBF_C$, and TSF values, such that values that occur more frequently within the first context are mapped to shorter codewords than other, less frequently-occurring values, as previously described.

As described above, video decoder 30 may determine whether the first chrominance component or the second chrominance component of the TU of the block is coded (914). In this manner, video decoder 30 may determine whether at least one of the first chrominance component and the second chrominance component of the TU of the block is coded, as previously described. In the event that both the first chrominance component and the second chrominance component are not coded, entropy decoding unit 70 may stop decoding the jointly encoded luminance CBF, chrominance CBF, and TSF for the TU (916), and proceed to other coding tasks, e.g., decoding of other syntax elements for the CU or a subsequent CU. In the event at least one of the first chrominance component and the second chrominance component is coded, however, video decoder 30 may continue the decoding process by determining which of the first and second chrominance components is coded.

For example, video decoder 30 may receive an indication of whether the first chrominance component and the second chrominance component of the TU are coded. In some examples, video decoder 30 may receive this indication in the form of explicitly signaled $CBF_U$ and $CBF_V$ for the TU in the bitstream, wherein each CBF is signaled individually. In other examples, video decoder 30 may receive this indication in the form of jointly encoded $CBF_U$ and $CBF_V$ for the TU in a substantially similar manner as described above with reference to decoding jointly encoded $CBF_Y$, $CBF_C$, and TSF for the TU.

For example, entropy decoding unit 70 may receive a second codeword for the TU (918). The second codeword may also comprise a VLC codeword, and may correspond to the jointly encoded $CBF_U$ and $CBF_V$ for the TU. To decode the second codeword, entropy decoding unit 70, or another unit of video decoder 30, may determine a second context for the TU (920). Once again, for example, entropy decoding unit 70 may determine the second context for the TU in a substantially similar manner as described above with reference to entropy encoding unit 56 of FIG. 8, based on e.g., one or more of the following: a partition level for the CU, a partition level for the TU, a prediction mode for a PU corresponding to the TU, and CBF values corresponding to first chrominance components and second chrominance components of neighboring TUs of the TU. For example, the neighboring TUs may be other TUs of the CU for which jointly encoded luminance CBFs, chrominance CBFs, and TSFs were previously decoded in the same manner as described herein. As one example, entropy decoding unit 70 may determine the partition level for the CU from the received syntax information contained within the header data for the CU, e.g., corresponding to a CU quadtree associated with an LCU of the CU, as previously described.

Entropy decoding unit 70 may further select a second VLC table based on the second context (922). For example, the second VLC table may include a mapping of codewords to $CBF_U$ and $CBF_V$ values. In some examples, entropy decoding unit 70 may use a same context for selecting both the first VLC table and the second VLC table, in which case the first and second contexts discussed above may comprise the same context.

Entropy decoding unit 70 may then determine whether the first chrominance component of the TU is coded based on the second codeword and the second VLC table. Furthermore, entropy decoding unit 70 may determine whether the second chrominance component of the TU is coded based on the second codeword and the second VLC table. For example, entropy decoding unit 70 may retrieve values for $CBF_U$ and $CBF_V$ syntax elements corresponding to the above determinations that are mapped to the received second codeword within the second VLC table. In this manner, entropy decoding unit 70 may determine whether the second codeword indicates that the first chrominance component of the TU is coded (924), as well as whether the second codeword indicates that the second chrominance component of the TU is coded (926).

Once again, VLC tables of video decoder 30 may be substantially similar to VLC tables of video encoder 20. As previously described, entropy decoding unit 70 may determine the second context for the TU in a substantially similar manner as described above with reference to entropy encoding unit 56 of FIG. 8. As such, video decoder 30 selecting the second VLC table using the second context may result in the second VLC table including a substantially similar mapping of VLC codewords to $CBF_U$ and $CBF_V$ values as that of a VLC table used by video encoder 20 to select the second codeword. This similarity among the mappings may enable video decoder 30 to make the above determinations using the second codeword and the second VLC table.

As described above, the results of the above determinations may correspond to the $CBF_U$ and $CBF_V$ for the TU. For example, a CBF value of "1" may indicate that the corresponding chrominance component of the TU is coded, and a CBF value of "0" may indicate that the chrominance component is not coded. As also described above, the second codeword may have a length that is inversely proportional to the likelihood of the $CBF_U$ and $CBF_V$ values, i.e., likelihood that the first chrominance component and the second chrominance component of the TU are coded, once again, for the TU for the second context.

As also described above, in some examples, entropy decoding unit 70 may further update the second VLC table based on the above determinations to reflect which determinations are more or less likely to occur (928). For example, entropy decoding unit 70 may update the mapping of the codewords to the $CBF_U$ and $CBF_V$ values within the second VLC table based on the determined $CBF_U$ and $CBF_V$ values, such that values that occur more frequently within the second context are mapped to shorter codewords than other, less frequently-occurring values, as previously described.

Finally, video decoder 30 may stop decoding the jointly encoded luminance CBF, chrominance CBF, and TSF for the TU (916), and proceed to other coding tasks, e.g., decoding of other syntax elements for the CU or a subsequent CU.

In this manner, the method of FIG. 9 represents an example of a method of decoding video data, including determining whether a component of a TU of a CU of video data includes at least one non-zero coefficient based on a codeword for the TU, determining whether the TU is split into sub-TUs based on the codeword, and decoding the TU based on the determinations.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a first syntax element of a transform unit of a coding unit of video data, wherein the first syntax element jointly represents whether at least one of a first chrominance component or a second, different chrominance component of the transform unit includes at least one non-zero coefficient and whether the transform unit is split into sub-transform units, wherein the first syntax element is separate from other syntax elements for the coding unit, and wherein the other syntax elements include a second syntax element indicating a prediction mode for at least a portion of the coding unit corresponding to the first chrominance component and the second chrominance component;
    determining whether at least one of the first chrominance component or the second, different chrominance component of the transform unit includes the at least one non-zero coefficient based on the first syntax element;
    determining whether the transform unit is split into the sub-transform units based on the first syntax element; and
    decoding the transform unit based on the determinations.

2. The method of claim 1, wherein determining whether the first chrominance component includes at least one non-zero coefficient based on the first syntax element comprises, after determining that at least one of the first chrominance component or the second chrominance component includes at least one non-zero coefficient based on the first syntax element, determining whether the first chrominance component includes at least one non-zero coefficient based on a third, different syntax element for the transform unit, the method further comprising:
    determining whether the second chrominance component includes at least one non-zero coefficient based on the third syntax element.

3. The method of claim 1, wherein the first syntax element comprises a codeword, the method further comprising:
    selecting a variable length code table based on a context for the transform unit, wherein the context includes at least one of a prediction mode for a prediction unit corresponding to the transform unit, a partition level for the transform unit, or a number of components of the transform unit represented by the codeword,
    wherein determining whether at least one of the first chrominance component or the second chrominance component includes at least one non-zero coefficient based on the codeword comprises determining whether the variable length code table indicates that the codeword represents that at least one of the first chrominance component or the second chrominance component includes at least one non-zero coefficient, and
    wherein determining whether the transform unit is split into the sub-transform units based on the codeword comprises determining whether the variable length code table indicates that the codeword represents that the transform unit is split into the sub-transform units.

4. The method of claim 3, further comprising updating the variable length code table based on the determinations.

5. The method of claim 1, wherein determining whether the transform unit is split into the sub-transform units based on the first syntax element comprises determining that the first syntax element represents that the transform unit is split into the sub-transform units, and wherein the sub-transform units correspond to smallest-sized transform units for the coding unit, the method further comprising determining that the sub-transform units are not split into further sub-transform units based on the sub-transform units corresponding to the smallest-sized transform units for the coding unit, without reference to respective syntax elements for the sub-transform units.

6. The method of claim 1, wherein the transform unit comprises one of a plurality of sub-transform units of a parent transform unit of the coding unit, wherein the parent transform unit has a size that is larger than a maximum permitted size for the coding unit, the method further comprising determining that the parent transform unit is split into the plurality of sub-transform units based on the parent transform unit having the size that is larger than the maximum permitted size for the coding unit, without reference to a respective syntax elements for the parent transform unit.

7. The method of claim 1, wherein determining whether the transform unit is split into the sub-transform units based on the first syntax element comprises determining that the first syntax element represents that the transform unit is split into the sub-transform units, the method further comprising determining whether the sub-transform units are split into further sub-transform units based on respective different syntax elements for the sub-transform units.

8. An apparatus for decoding video data, the apparatus comprising:
    a memory configured to store video data; and
    a video decoder configured to:
        decode a first syntax element of a transform unit of a coding unit of the video data, wherein the first syntax element jointly represents whether at least one of a first chrominance component or a second, different chrominance component of the transform unit includes at least one non-zero coefficient and whether the transform unit is split into sub-transform units, wherein the first syntax element is separate from other syntax elements for the coding unit, and wherein the other syntax elements include a second syntax element indicating a prediction mode for at least a portion of the coding unit corresponding to the first chrominance component and the second chrominance component,
        determine whether at least one of the first chrominance component or the second, different chrominance component of the transform unit includes the at least one non-zero coefficient based on the first syntax element,
        determine whether the transform unit is split into the sub-transform units based on the first syntax element, and
        decode the transform unit based on the determinations.

9. The apparatus of claim 8, wherein to determine whether the first chrominance component includes at least one non-zero coefficient based on the first syntax element, the video decoder is configured to, after determining that at least one of the first chrominance component or the second chrominance component includes at least one non-zero coefficient based on the first syntax element, determine whether the first chrominance component includes at least one non-zero coefficient based on a third, different syntax element for the transform unit, wherein the video decoder is further configured to:

determine whether the second chrominance component includes at least one non-zero coefficient based on the third syntax element.

10. The apparatus of claim 8, wherein the first syntax element comprises a codeword, wherein the video decoder is further configured to select a variable length code table based on a context for the transform unit, wherein the context includes at least one of a prediction mode for a prediction unit corresponding to the transform unit, a partition level for the transform unit, or a number of components of the transform unit represented by the codeword, wherein to determine whether at least one of the first chrominance component or the second chrominance component includes at least one non-zero coefficient based on the codeword, the video decoder is configured to determine whether the variable length code table indicates that the codeword represents that at least one of the first chrominance component or the second chrominance component includes at least one non-zero coefficient, and wherein to determine whether the transform unit is split into the sub-transform units based on the codeword, the video decoder is configured to determine whether the variable length code table indicates that the codeword represents that the transform unit is split into the sub-transform units.

11. The apparatus of claim 8, wherein the apparatus comprises at least one of:

an integrated circuit;

a microprocessor; or a wireless communication device that includes the video decoder.

12. An apparatus for decoding video data, the apparatus comprising:

means for decoding a first syntax element of a transform unit of a coding unit of video data, wherein the first syntax element jointly represents whether at least one of a first chrominance component or a second, different chrominance component of the transform unit includes at least one non-zero coefficient and whether the transform unit is split into sub-transform units, and wherein the first syntax element is separate from other syntax elements for the coding unit, and wherein the other syntax elements include a second syntax element indicating a prediction mode for at least a portion of the coding unit corresponding to the first chrominance component and the second chrominance component;

means for determining whether at least one of the first chrominance component or the second, different chrominance component of the transform unit includes the at least one non-zero coefficient based on the first syntax element means for determining whether the transform unit is split into the sub-transform units based on the first syntax element; and means for decoding the transform unit based on the determinations.

13. The apparatus of claim 12, wherein the means for determining whether the first chrominance component includes at least one non-zero coefficient based on the first syntax element comprises means for, after determining that at least one of the first chrominance component or the second chrominance component includes at least one non-zero coefficient based on the first syntax element, determining whether the first chrominance component includes at least one non-zero coefficient based on a third, different syntax element for the transform unit, further comprising:

means for determining whether the second chrominance component includes at least one non-zero coefficient based on the third syntax element.

14. The apparatus of claim 12, wherein the first syntax element comprises a codeword, further comprising:

means for selecting a variable length code table based on a context for the transform unit, wherein the context includes at least one of a prediction mode for a prediction unit corresponding to the transform unit, a partition level for the transform unit, or a number of components of the transform unit represented by the codeword, wherein the means for determining whether at least one of the first chrominance component or the second chrominance component includes at least one non-zero coefficient based on the codeword comprises means for determining whether the variable length code table indicates that the codeword represents that at least one of the first chrominance component or the second chrominance component includes at least one non-zero coefficient, and wherein the means for determining whether the transform unit is split into the sub-transform units based on the codeword comprises means for determining whether the variable length code table indicates that the codeword represents that the transform unit is split into the sub-transform units.

15. A computer program product comprising a non-transitory computer-readable storage medium having stored thereon instructions that, when executed, cause a processor of a device for decoding video data to:

decode a first syntax element of a transform unit of a coding unit of video data, wherein the first syntax element jointly represents whether at least one of a first chrominance component or a second, different chrominance component of the transform unit includes at least one non-zero coefficient and whether the transform unit is split into sub-transform units, and wherein the first syntax element is separate from other syntax elements for the coding unit, and wherein the other syntax elements include a second syntax element indicating a prediction mode for at least a portion of the coding unit corresponding to the first chrominance component and the second chrominance component;

determine whether at least one of the first chrominance component or the second, different chrominance component of the transform unit includes the at least one non-zero coefficient based on the first syntax element determine whether the transform unit is split into the sub-transform units based on the first syntax element; and decode the transform unit based on the determinations.

16. The computer program product of claim 15, wherein the instructions that cause the processor to determine whether the first chrominance component includes at least one non-zero coefficient based on the first syntax element comprise instructions that cause the processor to, after determining that at least one of the first chrominance component or the second chrominance component includes at least one non-zero coefficient based on the first syntax element, determine whether the first chrominance component includes at least one non-zero coefficient based on the a third, different syntax element for the transform unit, further comprising instructions that cause the processor to determine whether the second chrominance component includes at least one non-zero coefficient based on the third syntax element.

17. The computer program product of claim 15, wherein the first syntax element comprises a codeword, further comprising instructions that cause the processor to select a variable length code table based on a context for the transform unit, wherein the context includes at least one of a prediction mode for a prediction unit corresponding to the transform unit, a partition level for the transform unit, or a number of components of the transform unit represented by the codeword, wherein the instructions that cause the processor to determine whether at least one of the first chrominance component or the second chrominance component includes at least one non-zero coefficient based on the codeword comprise instructions that cause the processor to determine whether the variable length code table indicates that the codeword represents that at least one of the first chrominance component or the second chrominance component includes at least one non-zero coefficient, and wherein the instructions that cause the processor to determine whether the transform unit is split into the sub-transform units based on the codeword comprise instructions that cause the processor to determine whether the variable length code table indicates that the codeword represents that the transform unit is split into the sub-transform units.

18. A method of encoding video data, the method comprising:

determining whether at least one of a first chrominance component or a second, different chrominance component of a transform unit of a coding unit of video data includes at least one non-zero coefficient;

determining whether the transform unit is split into sub-transform units; and encoding a first syntax element based on the determinations such that the first syntax element jointly represents whether at least one of the first chrominance component or the second, different chrominance component of the transform unit includes the at least one non-zero coefficient and whether the transform unit is split into the sub-transform units, such that the first syntax element is separate from other syntax elements for the coding unit, wherein the other syntax elements include a second syntax element indicating a prediction mode for at least a portion of the coding unit.

19. The method of claim 18, the method further comprising, when at least one of the first chrominance component or the second chrominance component includes at least one non-zero coefficient, encoding a third, different codeword such that the third syntax element represents whether the first chrominance component includes at least one non-zero coefficient, and whether the second chrominance component includes at least one non-zero coefficient.

20. The method of claim 18, wherein the transform unit is split into the sub-transform units, and wherein the sub-transform units correspond to smallest-sized transform units for the coding unit, the method further comprising encoding one or more syntax elements representative of whether one or more components of the sub-transform units include at least one non-zero coefficient such that the syntax elements do not indicate whether the respective sub-transform units are split into further sub-transform units.

21. The method of claim 18, wherein the transform unit comprises one of a plurality of sub-transform units of a parent transform unit of the coding unit, wherein the parent transform unit has a size that is larger than a maximum permitted size for the coding unit, the method further comprising encoding one or more syntax elements representative of whether one or more components of the parent transform unit include at least one non-zero coefficient such that the syntax elements do not indicate whether the parent transform unit is split into the plurality of sub-transform units.

22. The method of claim 18, wherein the first syntax element comprises a codeword selected from a code table, the method further comprising selecting the code table based on a context for the transform unit, wherein the context includes at least one of a prediction mode for a prediction unit corresponding to the transform unit, a partition level for the transform unit, or a number of components of the transform unit to be represented by the first syntax element.

23. The method of claim 18, wherein the transform unit is split into the sub-transform units, the method further comprising:

encoding a third, different syntax element representative of whether the sub-transform units are split into further sub-transform units.

24. The method of claim 18, wherein the first syntax element comprises a codeword selected from a code table, the method further comprising updating the code table based on the determinations.

25. An apparatus for encoding video data, the apparatus comprising:

a memory configured to store video data; and a video encoder configured to:

determine whether at least one of a first chrominance component or a second, different chrominance component of a transform unit of a coding unit of the video data includes at least one non-zero coefficient;

determine whether the transform unit is split into sub-transform units; and encode a first syntax element based on the determinations such that the first syntax element jointly represents whether at least one of the first chrominance component or the second, different chrominance component of the transform unit includes the at least one non-zero coefficient and whether the transform unit is split into the sub-transform units, such that the first syntax element is separate from other syntax elements for the coding unit, wherein the other syntax elements include a second syntax element indicating a prediction mode for at least a portion of the coding unit.

26. The apparatus of claim 25, wherein the video encoder is further configured to, when at least one of the first chrominance component or the second chrominance component includes at least one non-zero coefficient, encode a third, different syntax element such that the third syntax element represents whether the first chrominance component includes at least one non-zero coefficient and whether the second chrominance component includes at least one non-zero coefficient.

27. The apparatus of claim 25, wherein the apparatus comprises at least one of:

an integrated circuit;

a microprocessor; or a wireless communication device that includes the video encoder.

28. An apparatus for encoding video data, the apparatus comprising:

means for determining whether at least one of a first chrominance component or a second, different chrominance component of a transform unit of a coding unit of video data includes at least one non-zero coefficient;
means for determining whether the transform unit is split into sub-transform units; and
means for encoding a first syntax element based on the determinations such that the first syntax element jointly represents whether at least one of the first chrominance component or the second, different chrominance component of the transform unit includes the at least one non-zero coefficient and whether the transform unit is split into the sub-transform units, such that the first syntax element is separate from other syntax elements for the coding unit, wherein the other syntax elements include a second syntax element indicating a prediction mode for at least a portion of the coding unit.

29. The apparatus of claim 28, further comprising:
means for encoding, when at least one of the first chrominance component or the second chrominance component includes at least one non-zero coefficient, a third, different syntax element, wherein the third syntax element represents whether the first chrominance component includes at least one non-zero coefficient, and whether the second chrominance component includes at least one non-zero coefficient.

30. A computer program product comprising a non-transitory computer-readable storage medium having stored thereon instructions that, when executed, cause a processor of a device for encoding video data to:
determine whether at least one of a first chrominance component or a second, different chrominance component of a transform unit of a coding unit of video data includes at least one non-zero coefficient;
determine whether the transform unit is split into sub-transform units; and
encode a first syntax element based on the determinations such that the first syntax element jointly represents whether at least one of the first chrominance component or the second, different chrominance component of the transform unit includes the at least one non-zero coefficient and whether the transform unit is split into the sub-transform units, such that the first syntax element is separate from other syntax elements for the coding unit, wherein the other syntax elements include a second syntax element indicating a prediction mode for at least a portion of the coding unit.

31. The computer program product of claim 30, further comprising instructions that cause the processor to, when at least one of the first chrominance component or the second chrominance component includes at least one non-zero coefficient,
encode a third, different syntax element such that the third syntax element represents whether the first chrominance component includes at least one non-zero coefficient, and whether the second chrominance component includes at least one non-zero coefficient.

* * * * *